United States Patent [19]

Evans et al.

[11] Patent Number: 5,020,298

[45] Date of Patent: Jun. 4, 1991

[54] CONTINUOUSLY ROTATING PLATFORM WITH MULTIPLE MOUNTED DOUBLE CLIPPERS FOR CONTINUOUSLY FORMING LINK PRODUCT

[75] Inventors: Alfred J. Evans, Raleigh; Grant K. Chen, Cary; Dennis J. May, Pittsboro; Edward P. Brinson, Raleigh, all of N.C.

[73] Assignee: Delaware Capital Formation, Inc., Apex, N.C.

[21] Appl. No.: 270,222

[22] Filed: Nov. 14, 1988

Related U.S. Application Data

[63] Continuation-in-part of Ser. No. 105,665, Oct. 7, 1987, Pat. No. 4,821,485.

[51] Int. Cl.⁵ .................. B65B 9/15; B65B 51/05; B23P 11/00
[52] U.S. Cl. .................. 53/138.2; 53/576; 452/30; 29/243.57
[58] Field of Search .................. 53/138 A, 138 R, 550, 53/576; 17/33, 34; 29/243.56, 243.57

[56] References Cited

U.S. PATENT DOCUMENTS

| | | | |
|---|---|---|---|
| Re. 30,196 | 1/1980 | Velarde | 53/138 A X |
| 1,513,265 | 10/1924 | Offenhauser | 17/33 |
| 3,264,679 | 8/1966 | Moekle | 17/33 |
| 3,383,754 | 5/1968 | Klenz | 29/243.57 |
| 3,543,378 | 12/1970 | Klenz | 29/243.57 |
| 3,583,056 | 6/1971 | Klenz | . |
| 3,748,690 | 7/1973 | Niedecker | 17/33 |
| 3,783,583 | 1/1974 | Dobbert | 53/138 A |
| 3,795,085 | 3/1974 | Andre | . |
| 4,001,926 | 1/1977 | Velarde | 29/243.56 |
| 4,004,339 | 1/1977 | Velarde | . |
| 4,189,897 | 2/1980 | Ailey, Jr. et al. | . |
| 4,305,240 | 12/1981 | Grevich et al. | 53/550 X |
| 4,418,447 | 12/1983 | Ziolko | . |
| 4,420,856 | 12/1983 | Ziolko | . |
| 4,463,477 | 8/1984 | Ziolko | . |
| 4,571,805 | 2/1986 | Niedecker | 53/138 A X |
| 4,578,928 | 4/1986 | Andre et al. | . |
| 4,821,485 | 4/1989 | Evans et al. | 53/138 A |

Primary Examiner—Robert L. Spruill
Assistant Examiner—Beth Bianca
Attorney, Agent, or Firm—Allegretti & Witcoff, Ltd.

[57] ABSTRACT

An improved packaging device designed for the filling of flexible, tubular casing and for the sealing of the casing in discrete lengths which may then be further processed or packaged. The device includes a mounting assembly having a floor mounted frame with a rotatable platform supported by the frame. Adjacent the frame and platform is a device for feeding product through a product horn into casing which is shirred on the horn. The platform includes a plurality of specially designed clippers arranged in a circular array. As filled casing is discharged from the feeding mechanism it is directed tangentially into the circular array of rotating clippers which are equally spaced from each other. The clippers sequentially operate to gather the casing, apply spaced, double clips to the casing, sever the connection between adjacent clips, and to then discharge the packaged link from the device.

13 Claims, 24 Drawing Sheets

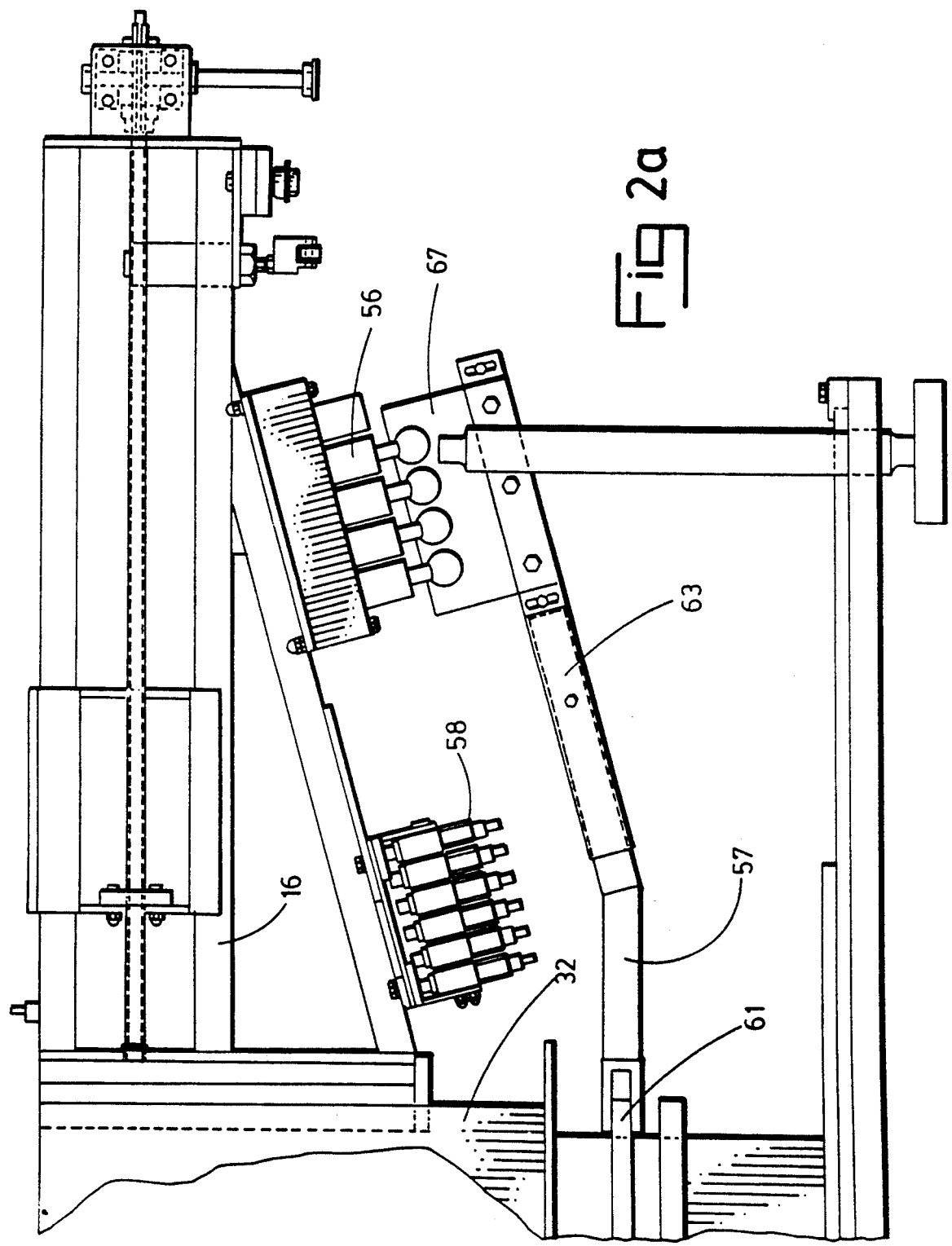

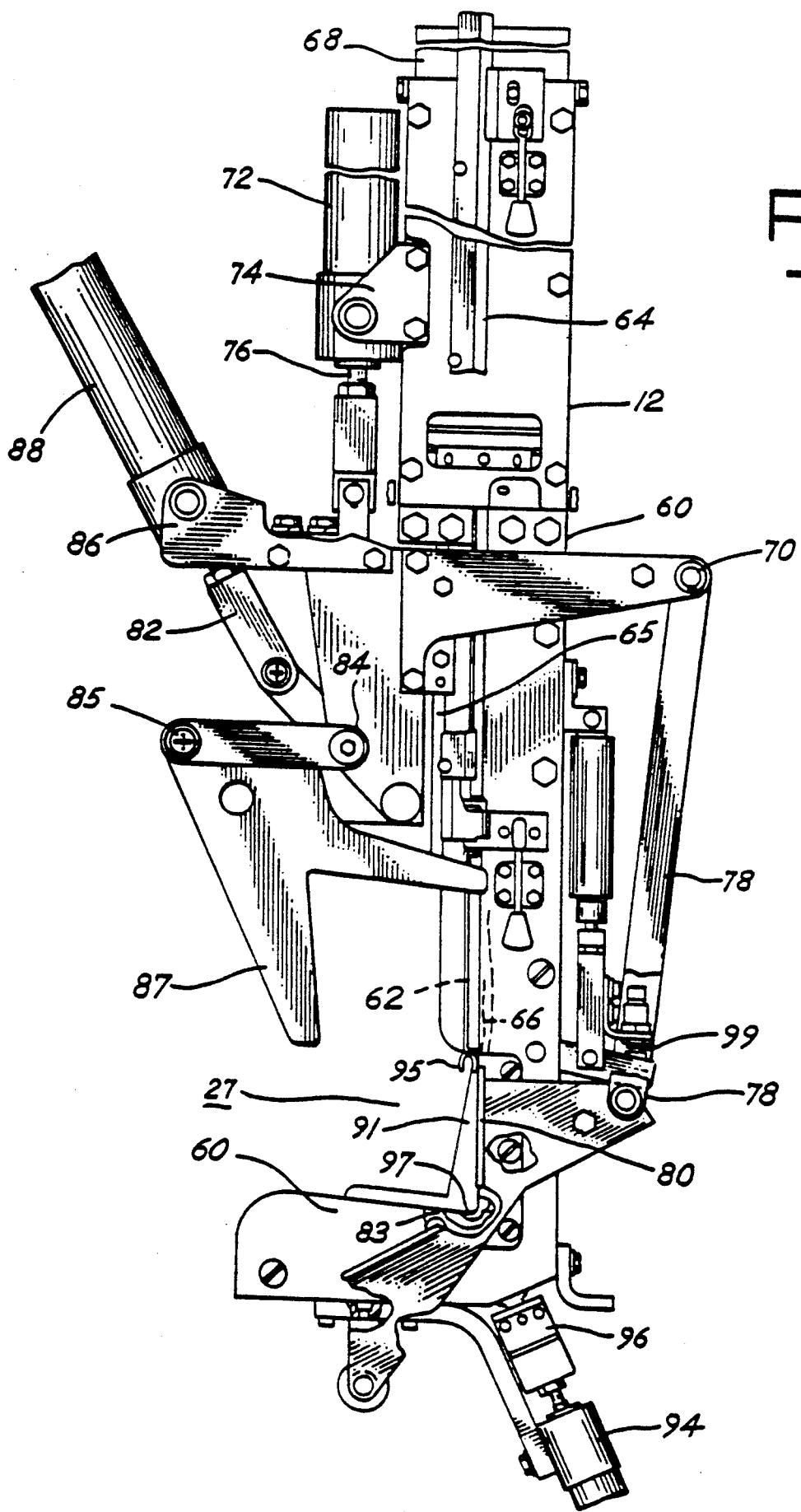

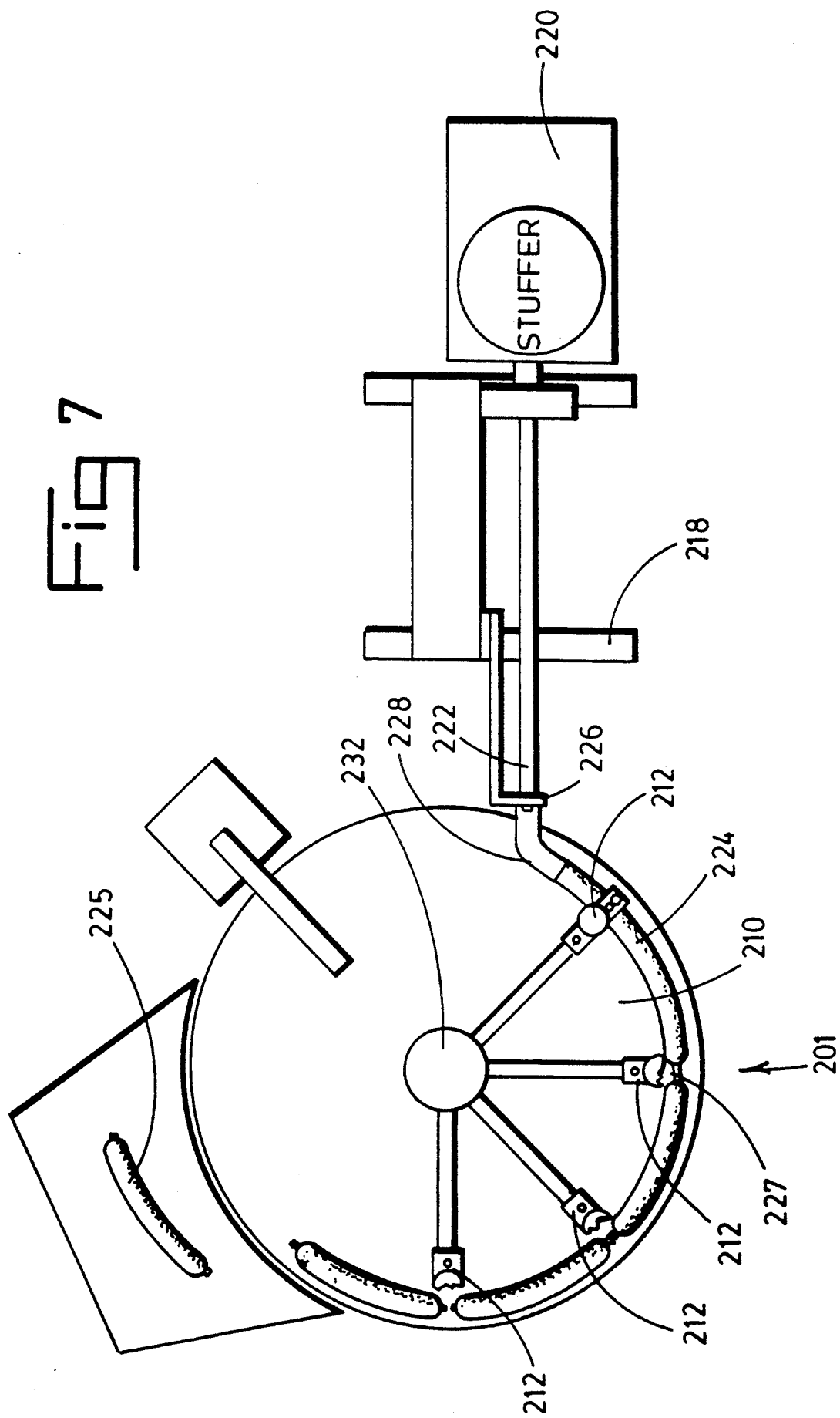

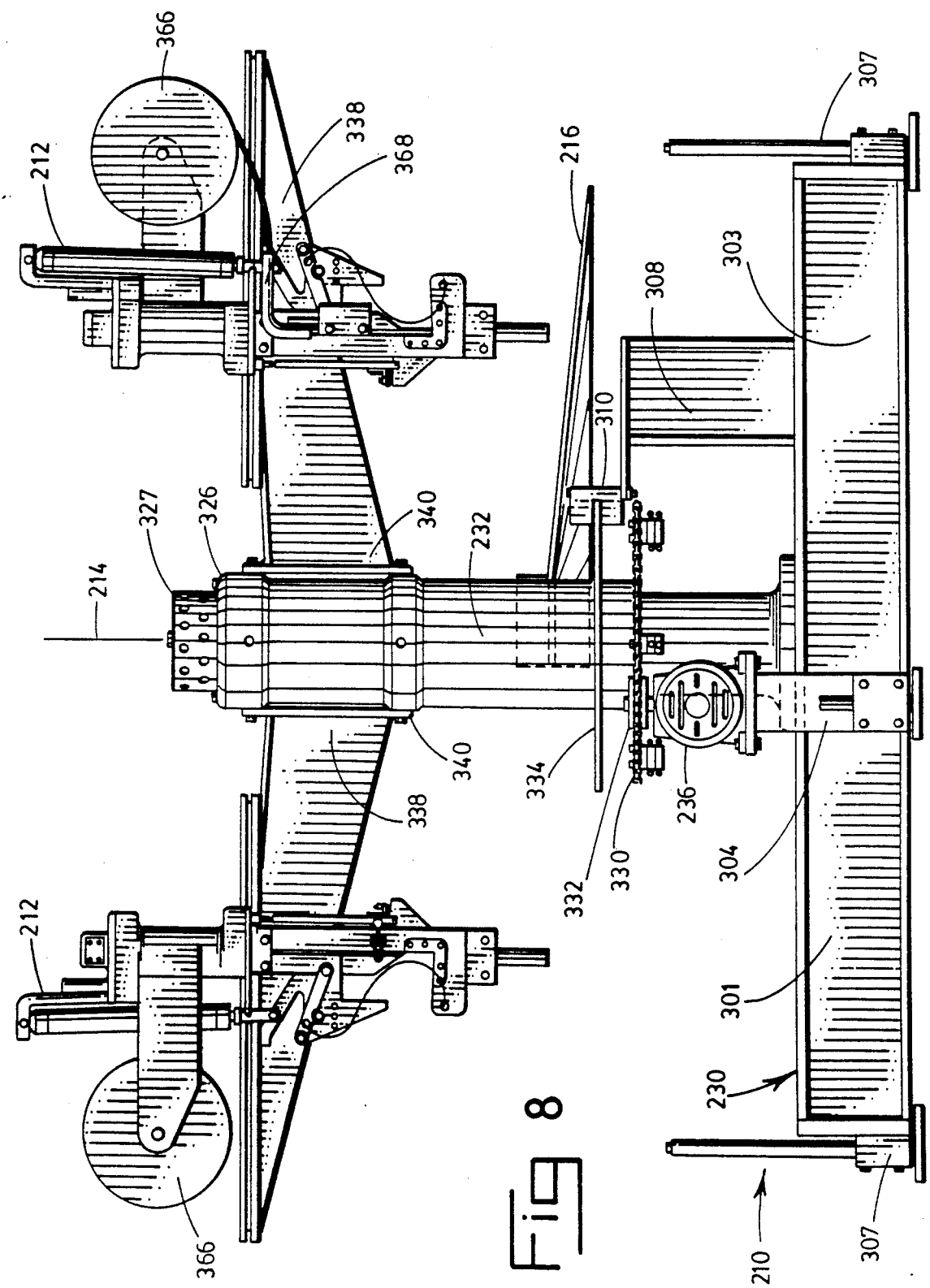

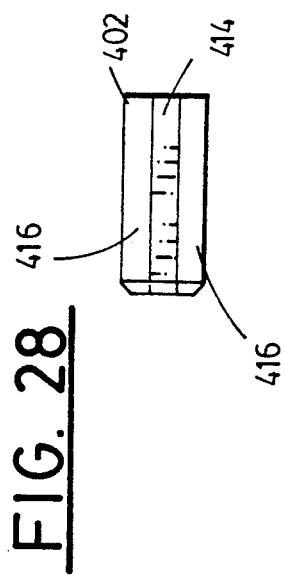
FIG. 28
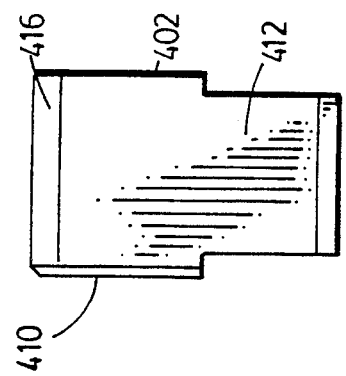
FIG. 27
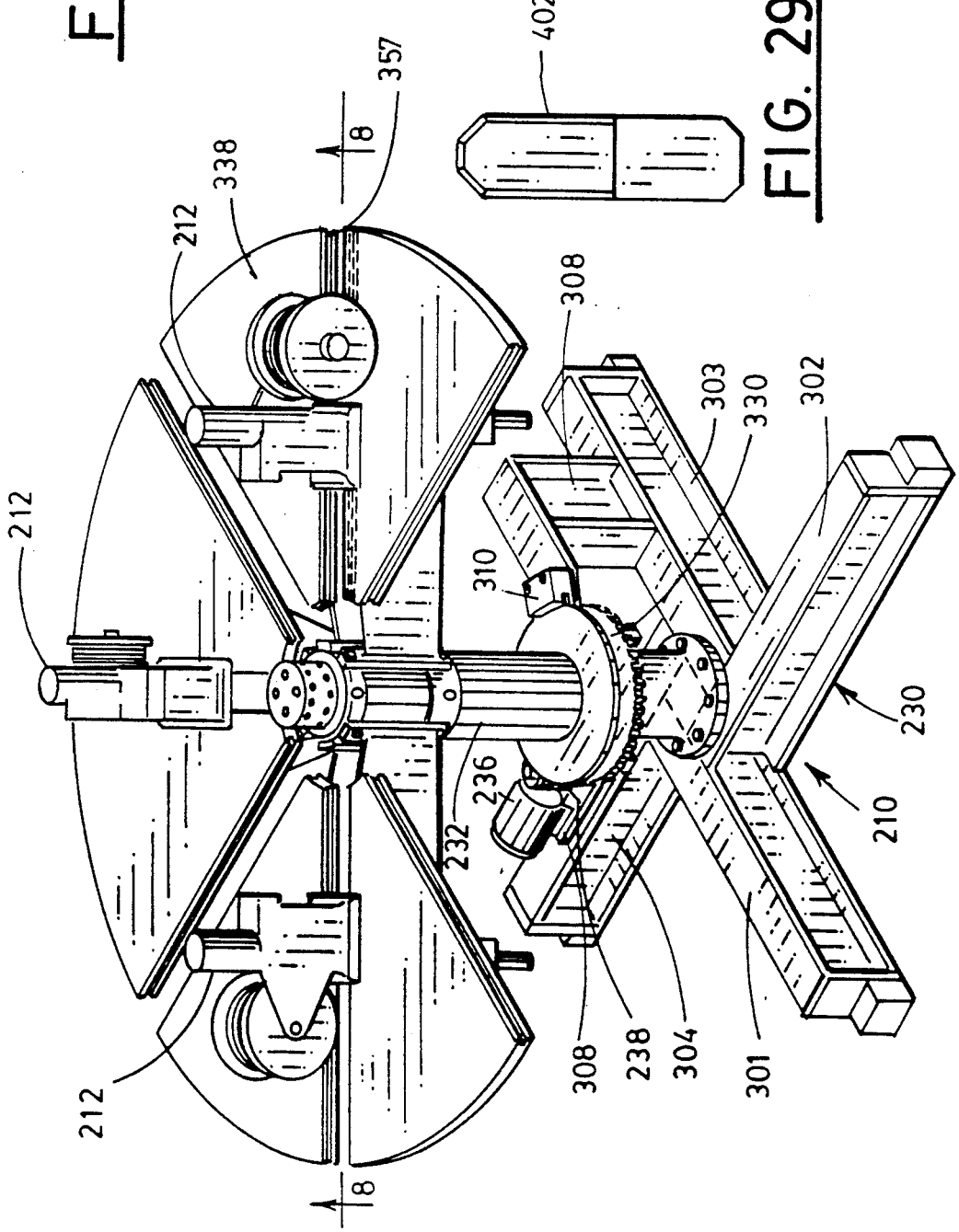
FIG. 29
FIG. 9

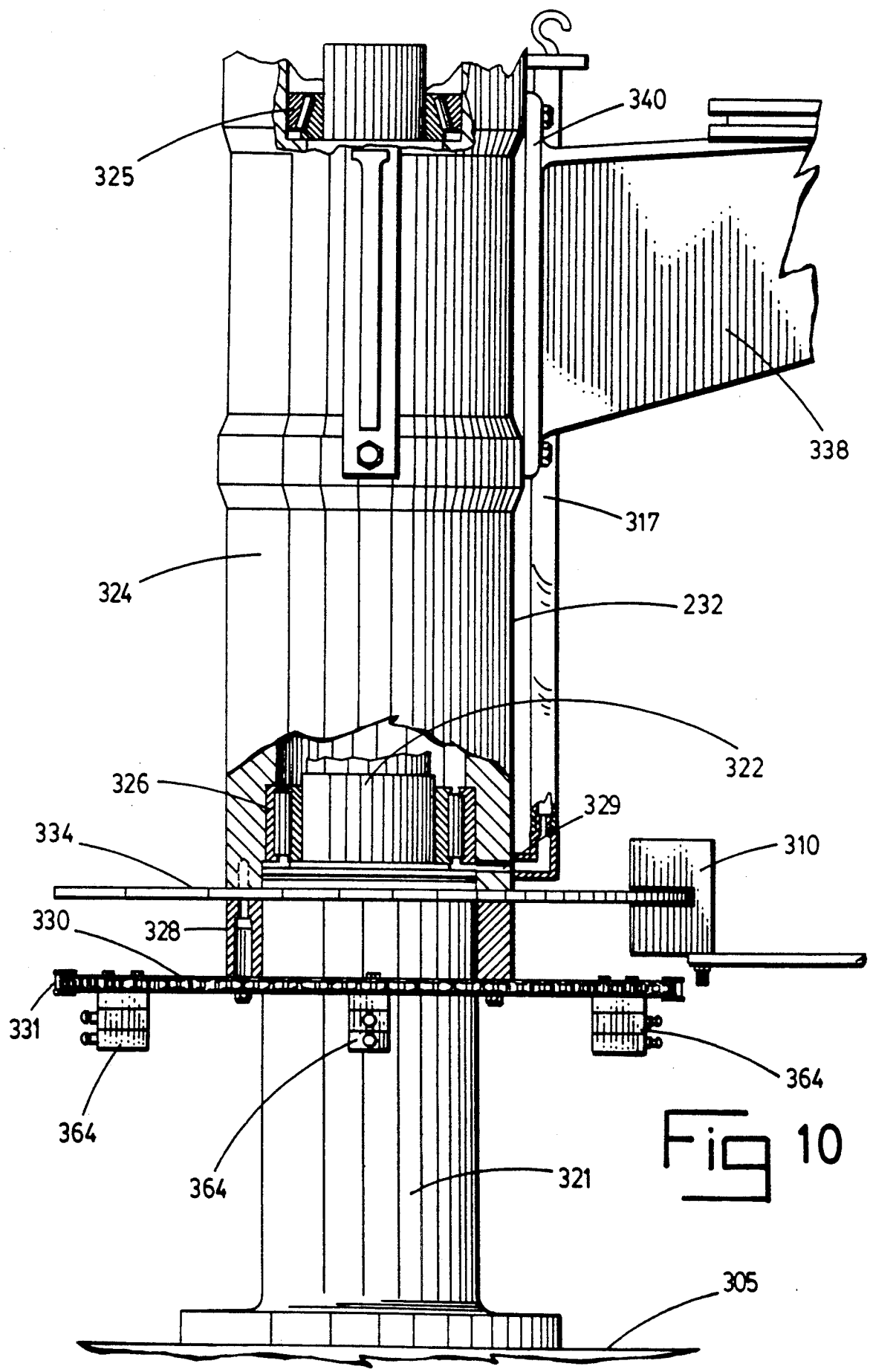

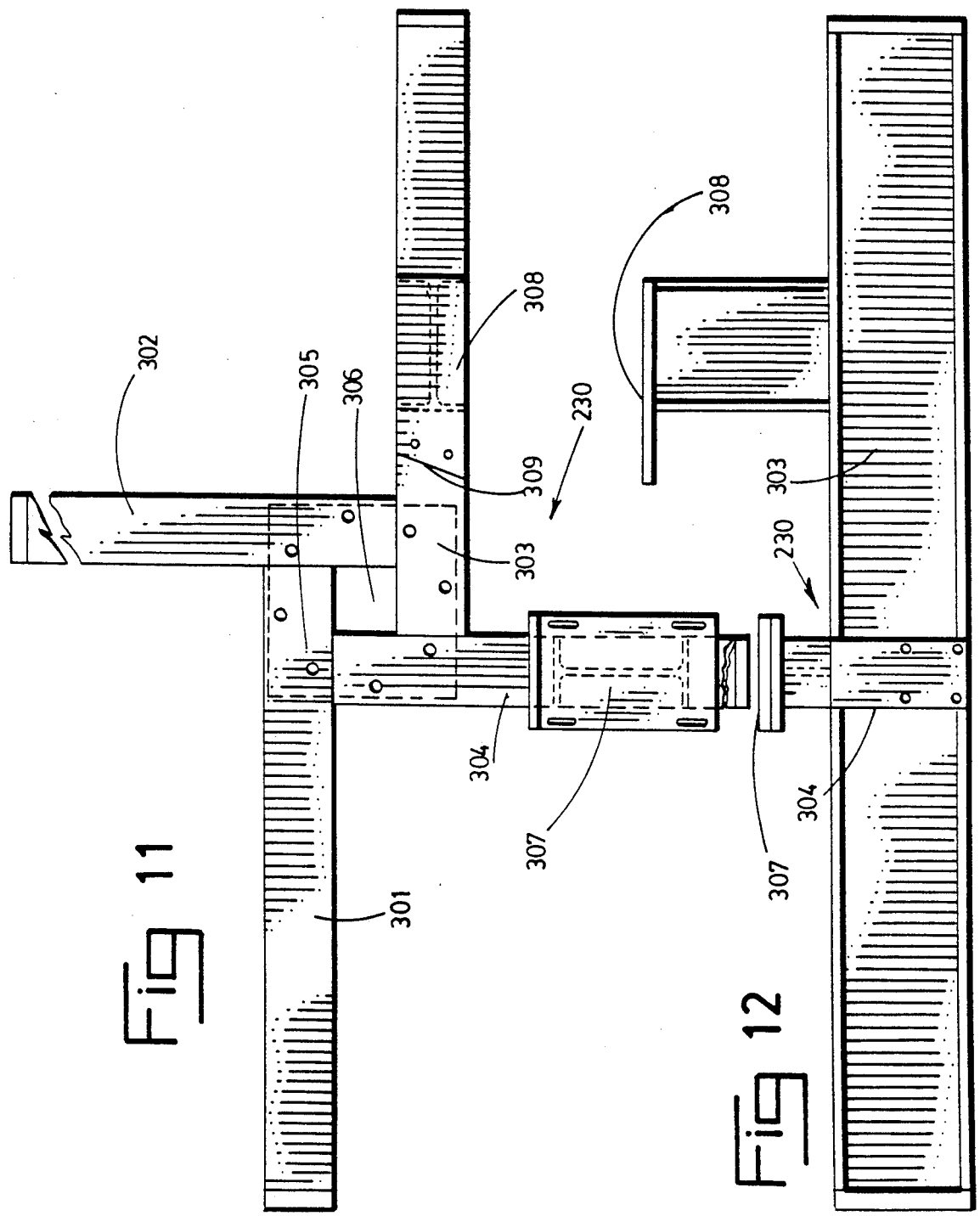

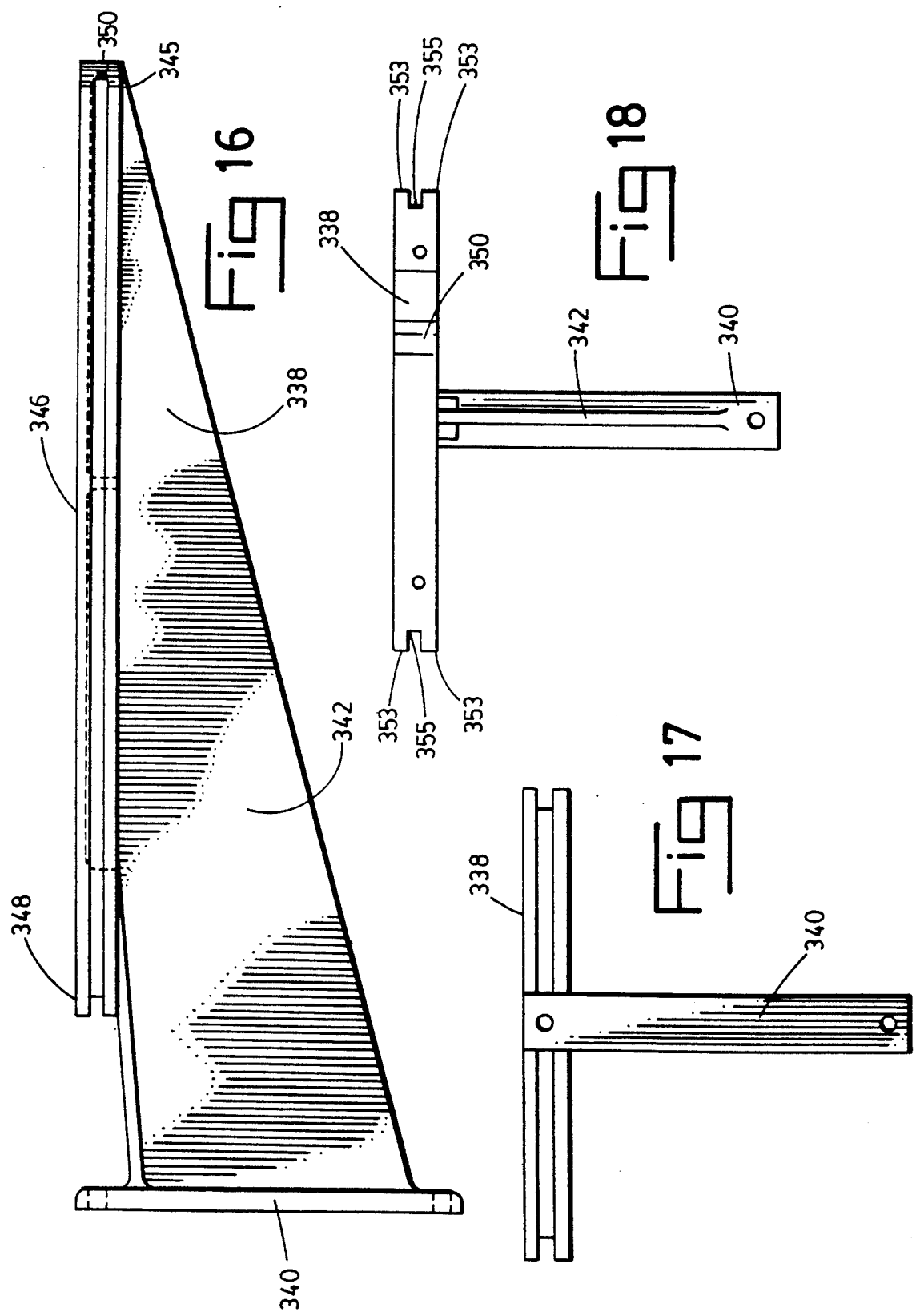

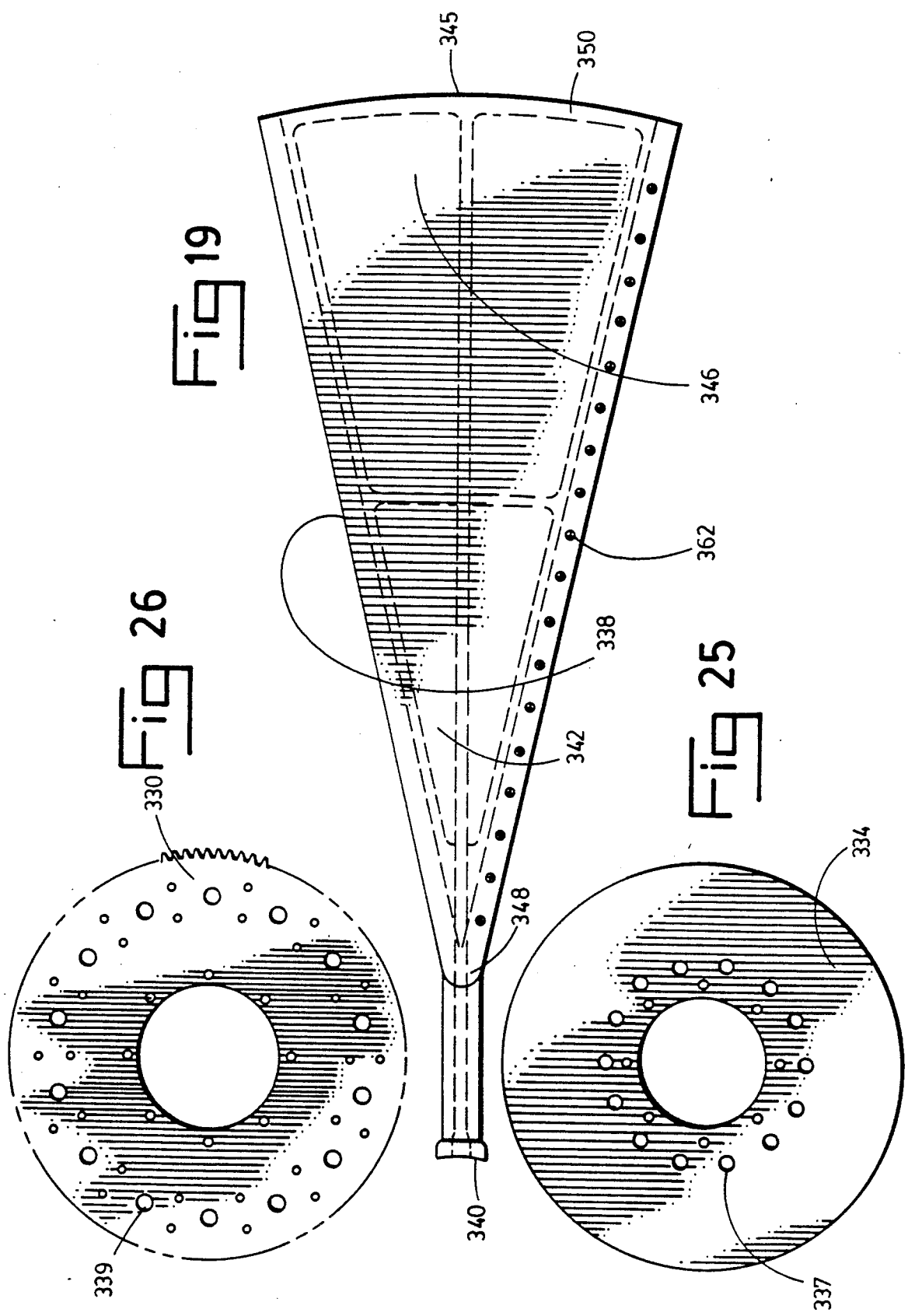

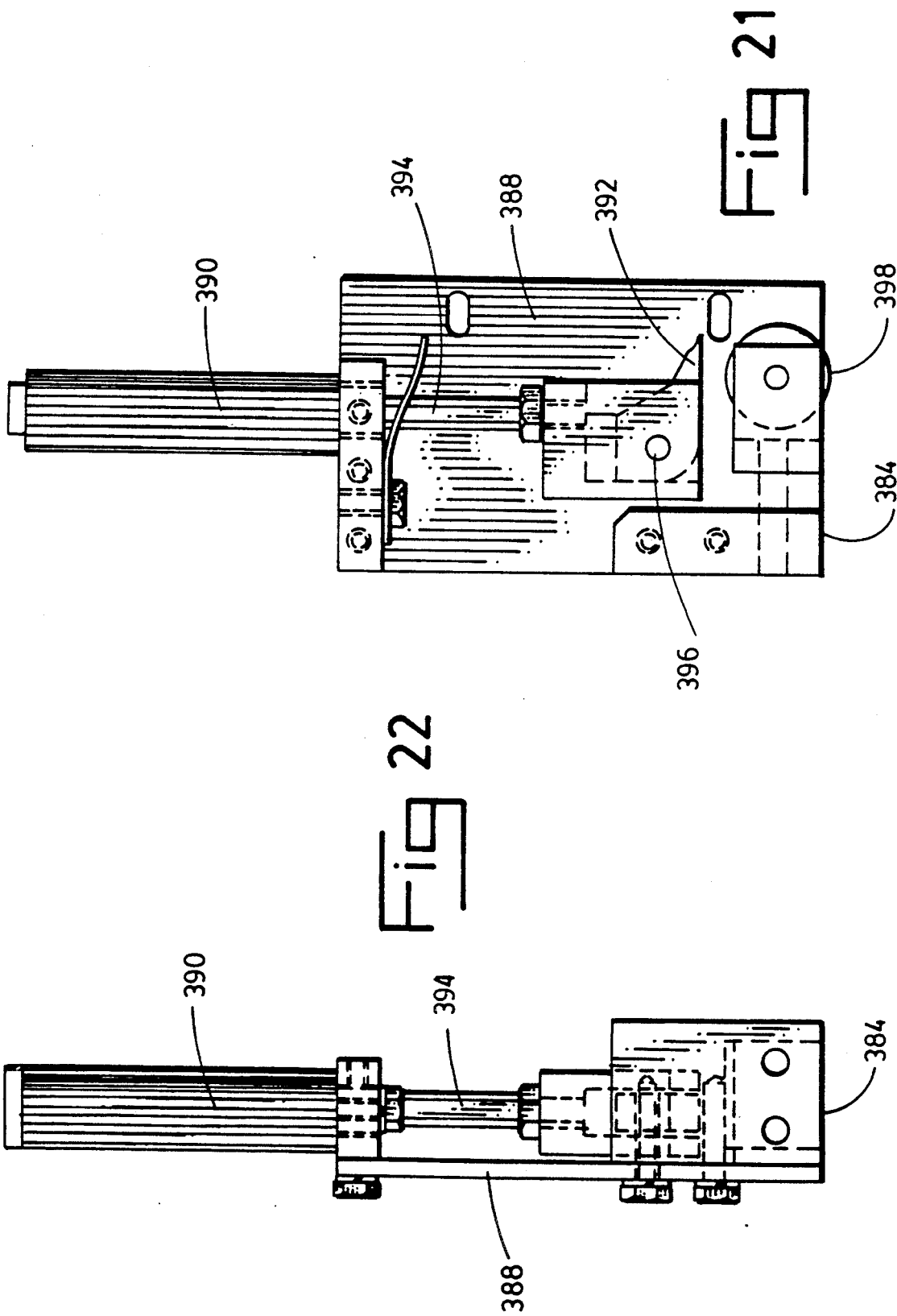

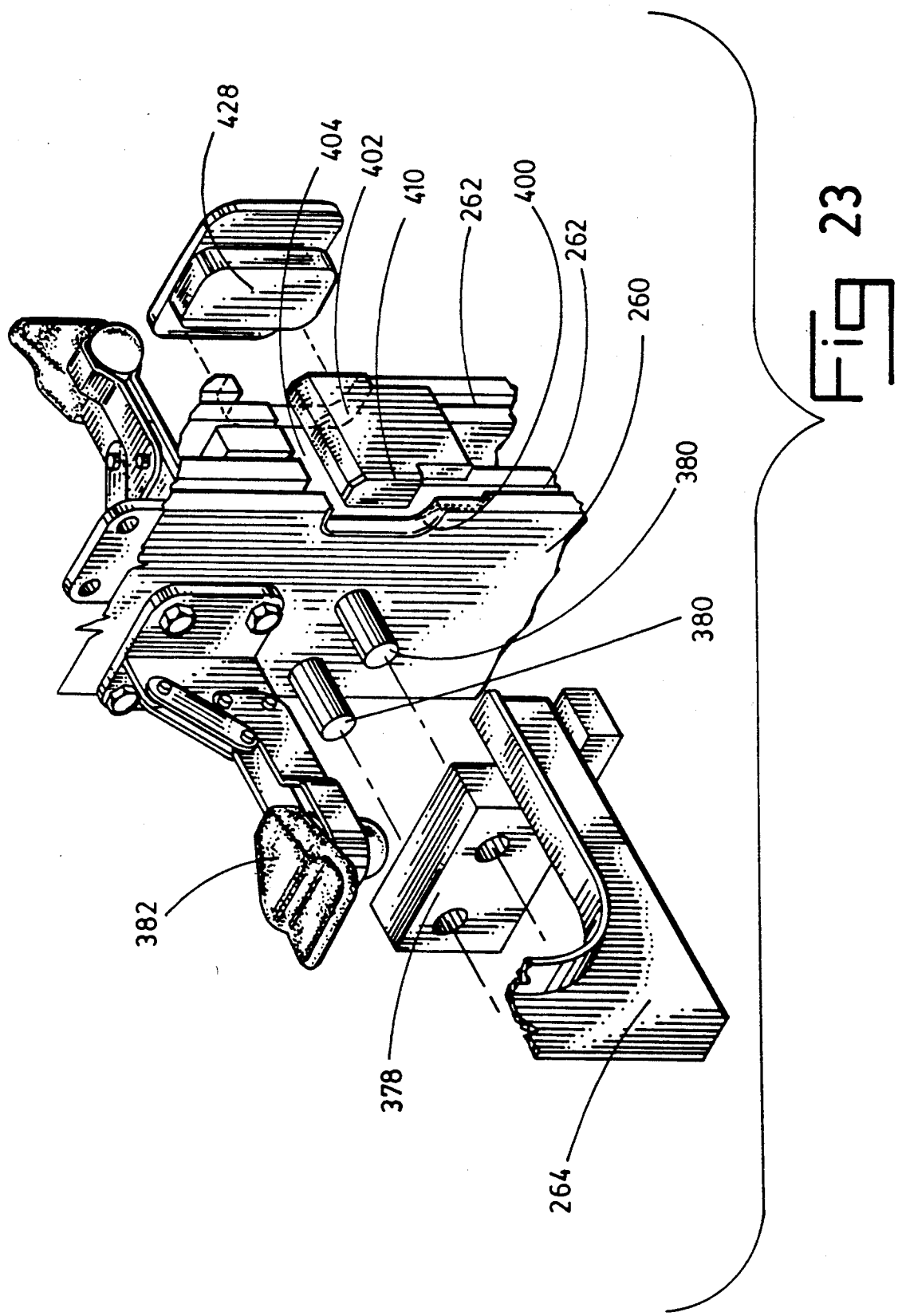

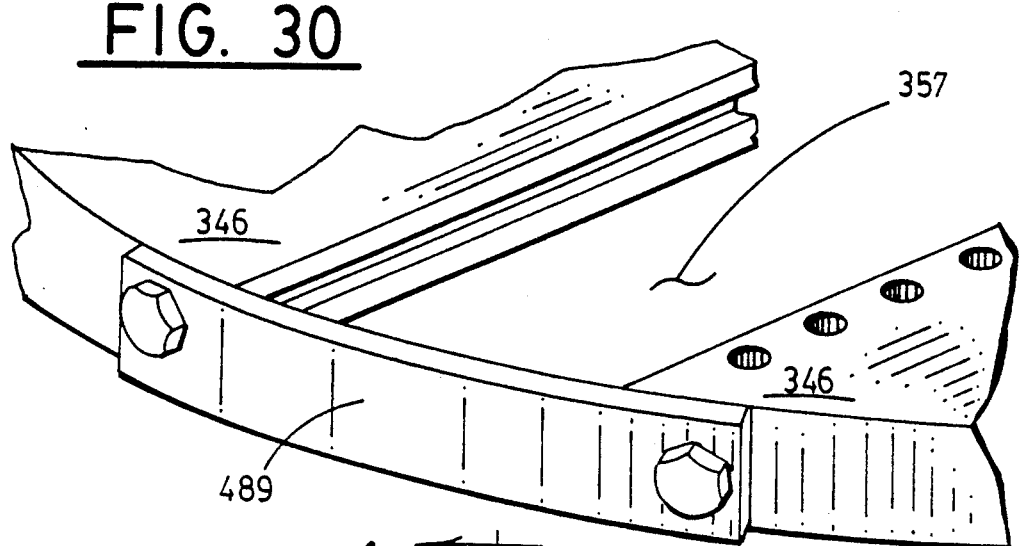
FIG. 30
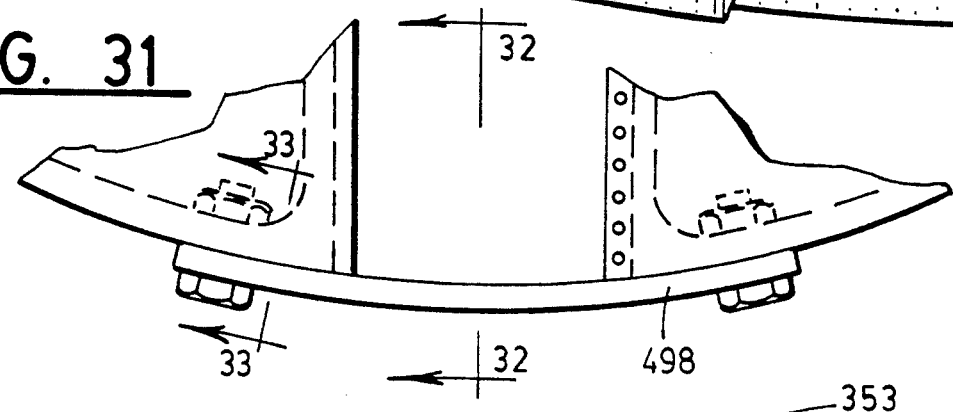
FIG. 31
FIG. 32
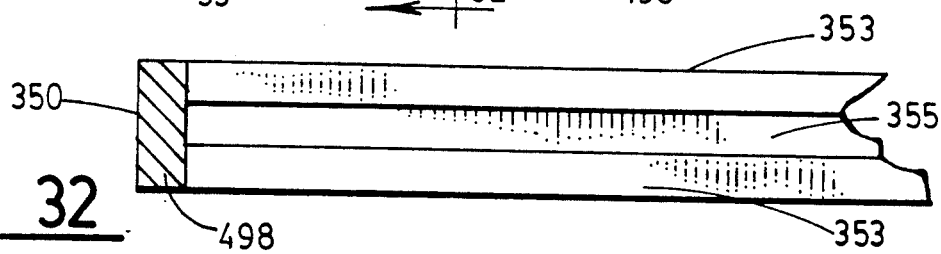
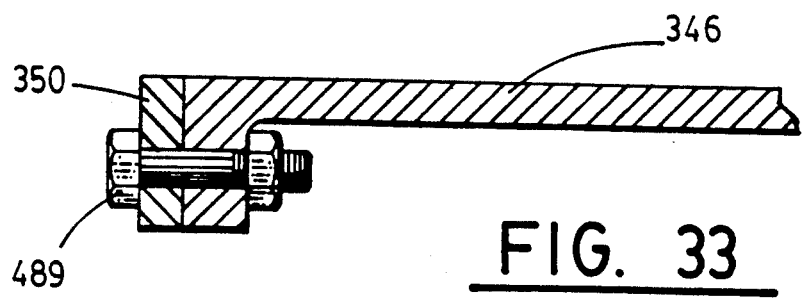
FIG. 33

CONTINUOUSLY ROTATING PLATFORM WITH MULTIPLE MOUNTED DOUBLE CLIPPERS FOR CONTINUOUSLY FORMING LINK PRODUCT

This is a continuation-in-part of application Ser. No. 07/105,665, filed Oct. 7, 1987, now U.S. Pat. No. 4,,821,485.

BACKGROUND OF THE INVENTION

This invention relates to an improved packaging device for filling formed and sealed tubular materials with pumpable products such as food products and for attaching double metal clips to the casing at intervals thereby enclosing or sealing the product in link form.

Various pumpable products, such as food products, and especially sausage or cheese, are packaged in tubular materials by attaching metal clips at spaced intervals thereby sealing and closing product within the tubular materials. Klenz in U.S. Pat. No. 3,383,754 issued May 21, 1968 discloses a device especially adapted for applying U-shaped metal clips about casing. Specifically, Klenz teaches the use of a punch for driving a U-shaped metal clip down a channel against a die to thereby form the clip about gathered casing retained at the bottom of the clip channel.

Klenz in U.S. Pat. No. 3,543,378 discloses the use of a pair of clippers arranged in tandem and cooperative with opposed movable casing gathering plates that define a pair of clip channels. The gathering plates move in opposition to each other to gather casing material into a constricted form or mass. Two U-shaped metal clips are then driven by punches about the gathered casing to seal the ends of the casing. A knife then cuts the casing between the clips to thereby separate the links defined by the clipped casing. Klenz in U.S. Pat. No. 3,583,056 discloses another clip attachment apparatus wherein a movable jaw pivots against a fixed jaw to gather the casing in a constricted region prior to attachment of a clip about the casing. Other patents disclose various combinations of gathering mechanisms for gathering casing prior to attachment of a clip or clips including Dobbert in U.S. Pat. No. 3,783,583, Velarde in U.S. Pat. No. 4,001,926, and Velarde in U.S. Pat. No. Re 30,196.

To increase the efficiency and utility of such clipping devices, it has been suggested in Andre U.S. Pat. No. 3,795,085 to mount a single clipper at a work station of a rotating table. A filled bag or casing which is to be clipped is placed on a nozzle at a first work station associated with the table. The casing material is then clamped as the table rotates to a second work station. Air in the casing is then evacuated through a vacuum system at a third station and ultimately, upon further rotation of the table to the clip work station, a clip is attached to the casing to seal the casing.

Andre U.S. Pat. No. 4,578,928 discloses yet another variation on this theme wherein a circular table is provided for gathering casing material fitted about a product and evacuating the casing material before finally placing a clip about the gathered casing material at a final work station. Ailey U.S. Pat. No. 4,189,897 discloses a packaging device wherein product is placed in casing material and the material is then gathered and clipped by means of a U-shaped metal clip. The '897 patent discloses a continuous line operation device having a series of stations placed on an endless belt with means provided for each station to evacuate the casing, gather the casing, and attach a clip thereto.

While the aforesaid devices have been useful, there has remained a need for a high speed continuously operable packaging device for attachment of metal clips to generally cylindrical, continuously filled casing. Such a need has been particularly acute with respect to the desire to form links of casing of variable length and diameter without major adjustment or alteration in the operation and configuration of the packaging device. Objectives of this general nature led to the development of the present machine which is especially useful for the manufacture of chubs and other sausage and link-type products having a wide variety of length and diameter.

SUMMARY OF THE INVENTION

In a principal aspect, the present invention comprises an improved packaging device designed for the filling of tubular, flexible casing and for the sealing of the casing in discreet lengths. Specifically, the device includes a mounting assembly having a floor mounted frame with a rotatable platform supported by the frame. Adjacent the frame and platform is a device or mechanism for feeding product through a product horn into tubular casing which is released from over the horn through a brake mechanism. The platform includes a plurality of specially designed clippers arranged in a circular pattern on the top of the platform. As filled casing is discharged from the feeding mechanism it is directed tangentially into the circular array of clippers. The clippers are equally spaced from one another on the circumference of a circle on the platform. The clippers sequentially operate to gather the casing, apply spaced U-shaped metal clips to the casing, sever the connection between adjacent clips, and to then discharge the packaged link from the device.

Thus, it is an object of the invention to provide an improved packaging device for filling flexible, tubular casing.

A further object of the invention is to provide an improved packaging device for filling flexible, tubular casing and for attachment of a U-shaped metal clips thereto to define discrete links of product.

Yet a further object of the invention is to provide a continuously operating packaging device which is adapted to receive generally cylindrical or tubular casing material as it is continuously filled by flow of product through a horn having shirred casing thereon. The shirred casing passes through a brake assembly to control the size and weight of the product.

Yet another object is to provide a platform having a plurality of clippers radially spaced about a pivot axis for the platform wherein the distance between the clippers and thus the radial distance of a clipper from the axis of rotation is adjustable.

Yet a further object of the invention is to provide an improved clipper which includes a special carriage and gate construction for gathering casing material prior to attachment of a clip thereto.

Yet a further object of the invention is to provide a packaging device which is capable of manufacturing a wide range of lengths of link product.

Yet a further object of the invention is to provide an improved packaging device including a plurality of clippers for the attachment of U-shaped metal clips to casing, said device having a simplified construction and high-speed operation relative to prior art packaging devices.

These and other objects, advantages and features of the invention will be set forth in th detailed description which follows.

BRIEF DESCRIPTION OF THE DRAWING

The preferred embodiments of the invention are described in the following section in detail. The description is made with reference to the accompanying drawing. Briefly, the accompanying drawing contains figures as follows:

FIG. 2a is a detail of the control of the device, a partial side cross-sectional view, in the area of valves 56, 58;

FIG. 3 is a side elevation of a clipper utilized in the packaging device of FIG. 1;

FIG. 7 is a top plan schematic of a second, and the most, preferred embodiment of the invention;

FIG. 8 is a side elevation view of the preferred embodiment of FIG. 7, shown with all but two clippers and clippers support brackets removed for illustration purposes (the two clippers shown are artifically suspended);

FIG. 9 is a perspective view of the machine which constitutes the second preferred embodiment;

FIG. 10 is an elevation view of the center column of the second preferred machine, with portions broken away to reveal internal detail;

FIG. 11 is a plan view of the base of the machine of FIG. 7 atop which the center column is mounted, with portions broken away for illustration purposes;

FIG. 12 is an elevation view of the base of FIG. 11, with portions broken away for illustration purposes;

FIG. 16 is a side elevation view of a clipper support bracket of the second preferred machine;

FIG. 17 is an end elevation view of the bracket of FIG. 16 as viewed from th right in FIG. 16;

FIG. 18 is an end elevation view of the bracket of FIG. 16 as viewed from the left in FIG. 16;

FIG. 19 is a top plan view of the bracket of FIG. 16;

FIG. 21 is a side elevation view opposite that of FIG. 20 of a clip pusher mechanism of the clip feed mechanism of FIG. 20;

FIG. 22 is an end elevation view of the clip pusher mechanism;

FIG. 23 is an exploded perspective view of the clip pusher mechanism;

FIG. 25 is a plan view of the brake disk of the brake mechanism of the second preferred machine;

FIG. 26 is a plan view of the sprocket of the drive of the second preferred machine;

FIG. 27 is a side elevation view of a short rail of the clipper, also shown in the exploded perspective of FIG. 23 and the side elevation of FIG. 24;

FIG. 28 is a top plan view of the short rail;

FIG. 29 is an end elevation view of the short rail;

FIG. 30 is a perspective view of a representative tie strap connecting the wedge members of the second embodiment;

FIG. 31 is a plan view of the area of FIG. 30;

FIG. 32 is a section through FIG. 31 along line 32—32;

FIG. 33 is a section through FIG. 31 along line 33—33;

DESCRIPTION OF THE PREFERRED EMBODIMENTS

I. The Embodiment Of FIGS. 1-6

A. General Description

Figure 1:
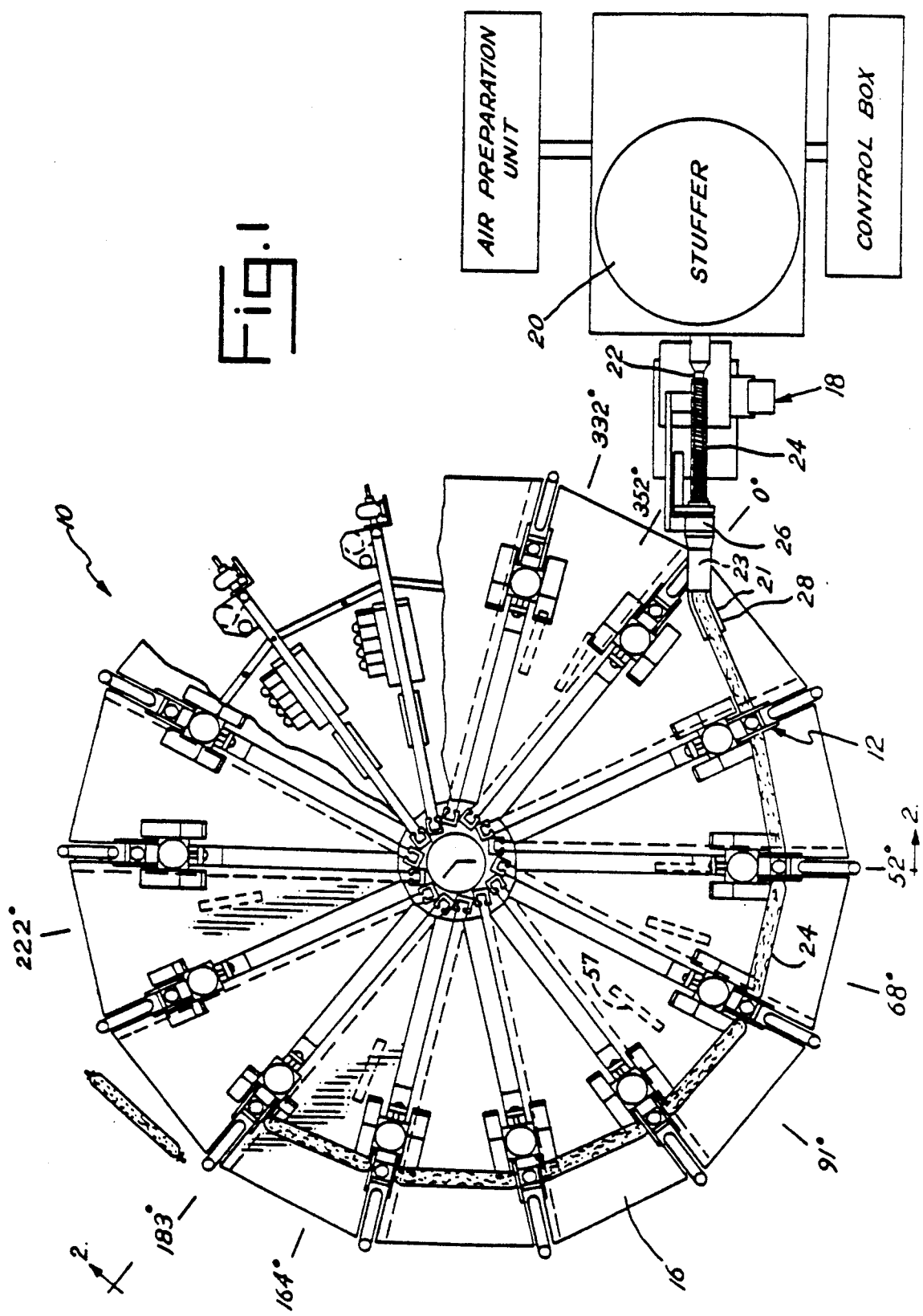
FIG. 1 is a top plan schematic of a first improved packaging device of the invention.

FIG. 1 is a schematic top plan view of the improved packaging device of the invention. The device generally includes a mounting assembly 10 having supported thereon a plurality of clippers 12. As depicted, each clipper 12 is normally positioned at an equal radial distance from a vertical rotation axis 14 (see FIG. 2) associated with a platform 16 of assemnbly 10. The device also includes a casing feed mechanism or construction 18 which receives food product, such as sausage, from a stuffing machine 20. The product is directed through a stainless steel tube or horn 22 associated with the casing feed mechanism 18 and into casing 24 which is shirred on the horn 22. As the casing 24 is filled by discharge of product from the horn 22, the casing is restrained by a brake 26. The filled casing 24 is then directed by a chute or channel 28 in a generally tangential direction with respect to the clippers 12 and the in the direction of rotation of the platform 16 as indicated by the arrow in FIG. 1.

The filled casing 24 then extends into a throat 27 (see FIG. 2) of one of the clippers 12 which passes the discharge end of the chute 28 as that clipper 12 moves along a circular path about axis 14. That clipper 12 then gathers the casing material, applied two spaced, U-shaped metal clips about the gathered casing 24, severs the casing 24 between the clips and ultimately discharges the formed casing 24 product or link from the platform 16. As shown in FIG. 1, these actions are effected sequentially by each clipper 12 as the platform 16 moves about the axis 14 to juxtapose each of the clippers 12 at the end of chute 28. In the preferred embodiment, the clippers 12 each operate in the following sequence:

(a) The clipper 12 includes a sliding carriage 70 that moves along a track to position a gate 85 (see FIG. 3) so as to initiate the casing 24 gathering operation. This operation commences when clipper 12 has rotated with platform 16 approximately 52° from the starting point indicated in FIG. 1;

(b) A clipper gathering gate 85 (see FIG. 3) then pivots to gather the casing 24 in a tightly compacted configuration at approximately 68° of rotation of the platform 16;

(c) At approximately 91°, or one quarter turn of the platform 16, a clipper punch 66 is actuated to engage a clip 95 and drive that clip about the casing 24 and against a die 97 to seal the casing 24;

(d) At approximately 164° of rotation of platform 16, a knife 96 serves the casing 24 between parallel closely attached clips 95 to sever a forward link of the product filled casing 24 from the remainder of the casing 24;

(e) At approximately 183° platform 16 rotation the knife 96 is retracted as is the punch 66;

(f) At approximately 222° of platform 16 rotation the gates 85 and carriage 70 are retracted and the device is readied for further use. Upon retraction of the carriage 70, an ejector mechanism or plate 80 acts to discharge the finished packaged product from the platform 16.

In the embodiment shown, there are fourteen clippers 12 that are equally spaced on platform 16 in a circular array about the axis 14. The clippers 12 are also equally radially spaced from the center axis 14. The clippers 12 may be moved inwardly and outwardly radially in a manner to be explained below. Generally the clippers 12 move in unison inwardly and outwardly toward and away from the axis 14. Alternate clippers 12 may be moved inwardly and toward the axis 14 thus eliminating their use in the packaging operation. By adjusting the radius position of the various clippers 12, it is thus possible to change the distance between respective clippers 12 and thus change the length of any link formed from the casing 24 and its contents. The length of any link is variable over a wide range, for example from 4 inches through 28 inches in length of any particular link depending upon the number of stations 12 and their radial position with respect to the axis 14.

In practice, the platform 16 not only rotates about the axis 14, but also the position of the platform 16 may be adjusted with respect to an underframe on which the platform 16 is arranged. This is necessary in order to position the platform 16 and thus the clippers 12 properly with respect to the casing feed construction 18. That is, the discharge chute 28 must be precisely positioned with respect to the clippers 12 in order to eliminate, to the greatest extent possible, stresses on casing 24. This is accompolished by avoiding flexure or bending of the casing 24 to the greatest extent possible. It is for this reason that the arc formed by the chute 28 is a gradual arc and further, the discharge of casing 24 and product from the chute 28 into cooperative relation with the clippers 12 is effected preferably at a tangent. Also, the radius or radial distance of the clippers 12 from the axis 14 is preferably a maximum.

With a device as described, it is possible to effect extremely high speed operation and formation of separate links of sausage-type product continuously inasmuch as the platform 16 continuously rotates and does not operate intermittently. Two hundred to four hundred units of product per minute are possible with the device as described.

B. Mounting Assembly

Figure 2:
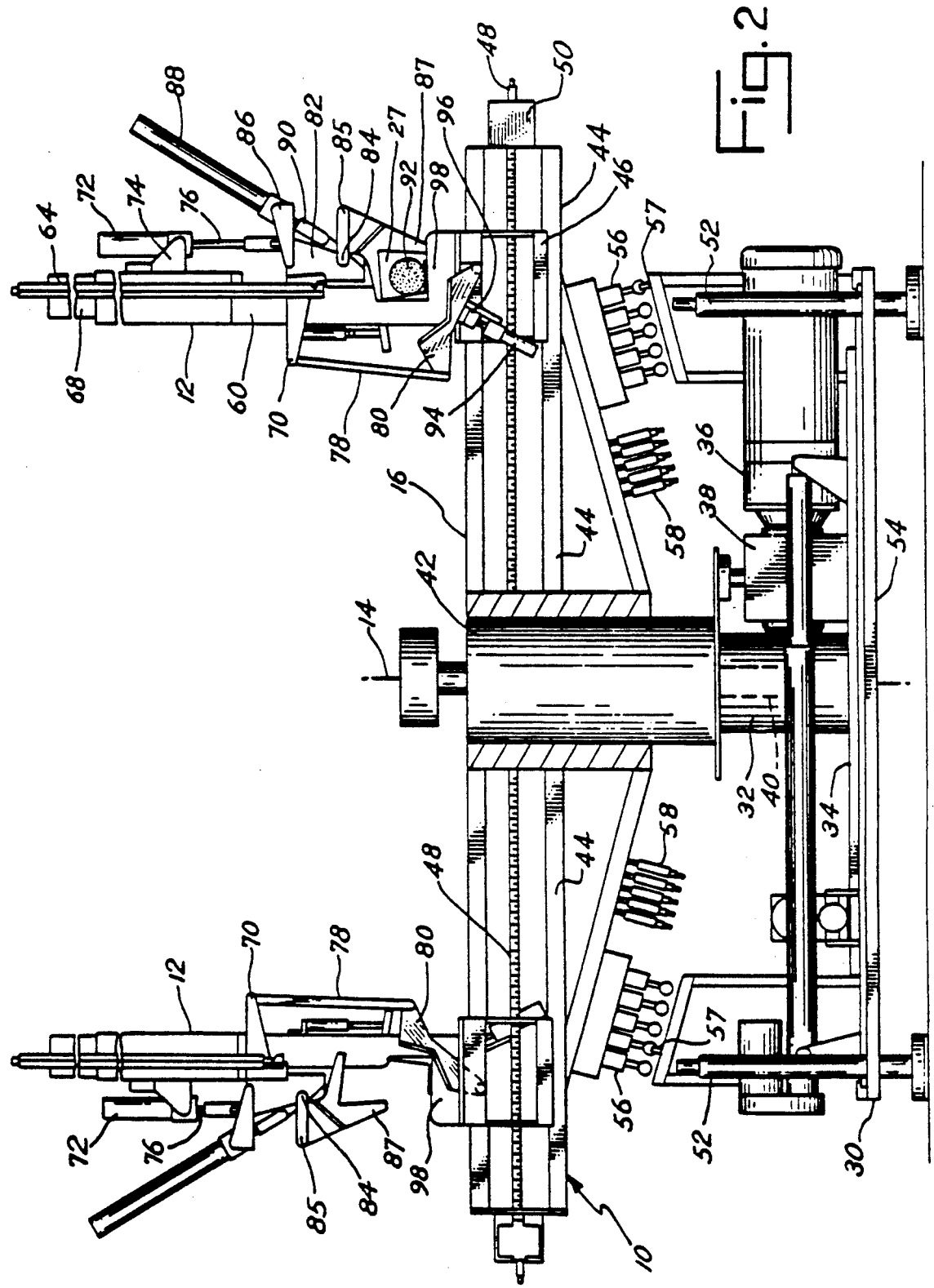
FIG. 2 is a side cross sectional view of the schematic of FIG. 1 taken substantially along the line 2—2.

FIG. 2 is a side elevation particularly of mounting assembly 10 and clippers 12. Thus, the mounting assembly 10 includes a support frame 30 having a central support post 32. The post 32 is rigidly supported vertically upward by means of the frame 30 and includes brackets or frame members 34 which support a motor 36. The motor 36 has an output shaft which operates through a transmission 38 to engage a vertical drive shaft 40. The shaft 40 connects via a chain drive with a center cylinder post 42 mounted on the post 32. The chain drive includes a clutch and drive sprocket 41 and a driven sprocket 43. Shaft 40 rotationally drives that center cylinder post 42 in a clockwise direction as depicted in FIG. 1. The motor 36 is a variable speed motor and thus may be operated at any desired speed to effect a desired rotational speed of the cylinder post 42 and the attached platform 16.

The platform 16 is attached to the cylinder post 42 and includes radial arms 44 each of which supports a separate clipper 12. Each arm 44 receives a sliding block 46 through which a threaded rod 48 is fitted. A clipper 12 is mounted on each block 46. By rotation of the threaded rod 48, it is possible to adjust the radial distance of the block 46 and thus the radial distance of the clipper 12 with respect to the center axis 14 of the platform 16.

The construction of the rod 48 and the mechanism for rotating the rod 48 may be such that the rods 48 associated with each clipper 12 are mechanically or electrically interconnected. Thus, for example, if rod 48 is driven by a motor 50, the motor 50 may be a synchronous motor synchronized to operate in unison with similar motors associated with the other clippers 12. In this manner the precise position of each of the blocks 46 may be controlled so that the clippers 12 will all be at the same radial distance from the axis 14 during the operation of the device.

The motor 36 and post 32 are attached to a support plate 34 and this plate is powered for movement by a linear actuator comprised of a motor, gearbox and ball screw assembly 53. The support plate 34 slides atop a support plate 51. The support plate 51 also slides, at right angles to the direction of sliding of the slide plate 34. The support 51 is supported atop a base plate 54. The support plate 51 is powered by a linear actuator 55 and moves the slide at right angles to the support plate. The plates 34, 51, 54 and associated components comprise a frame 30 which includes adjustable height legs 52 which enable the entire assembly 10 to be raised or lowered to a desired position. The plates 34, 51, 54 and associated components provide adjustment in a horizontal plane in order to orient the device properly, for example, with the casing feed mechanism or construction 18.

Supported by each arm 44 are a series of pneumatic valves 56. Each valve is associated with a pneumatic cylinder which incorporated as part of the associated clipper 12 mounted on that arm 44. Pneumatic pilot valves 58 are also positioned on each arm 44 and incorporated in the pneumatic control circuit for valves 56. The pivot valves 58 are each interactive with a cam actuator mounted on a cam arm. The cam arms are attached to the post 32 by a clamp ring assembly and each cam arm is adjustable radially so as to allow for timing adjustments.

The pilot valves 58 each actuate a pilot operation on a power valve 56 which in turn operates an output actuator device on the clippers 12. Two additional arms such as arm 57, representative of all arms, are mounted by the clamp ring 61 and radially adjustable at 63 as shown. The additional arm shown supports a urethan flap 67 which resets all valves 58 after complete clipper functioning, except the valves controlling the punch and knife of the clipper. The valves of the punch and knife are reset earlier than the remaining valves, by a similar arm and flap structure. Thus, at the valves 56, 58 sweep over the cam actuators 57 projecting in their path, the valves 56, 58 will be selectively actuated to effect an operation of the pneumatic clipper 12 positioned on that arm 44.

Note that each arm 44 maintains its own independent set of valves 56 and 58 for operation of the associated clipper 12. Note also that each set of valves 56 and 58 will be thrown or actuated by engagement with one cam actuator 57 supported on the brackets 59 beneath the arms 44. In this manner, regardless of speed of rotation of the platform 16 and regardless of the number or position of the clippers 12, the actuation, operation and sequence of operation of the clippers 12 will always be the same for each and every clipper 12 as it rotates with the platform 16.

C. Clipper Construction

Figure 4:
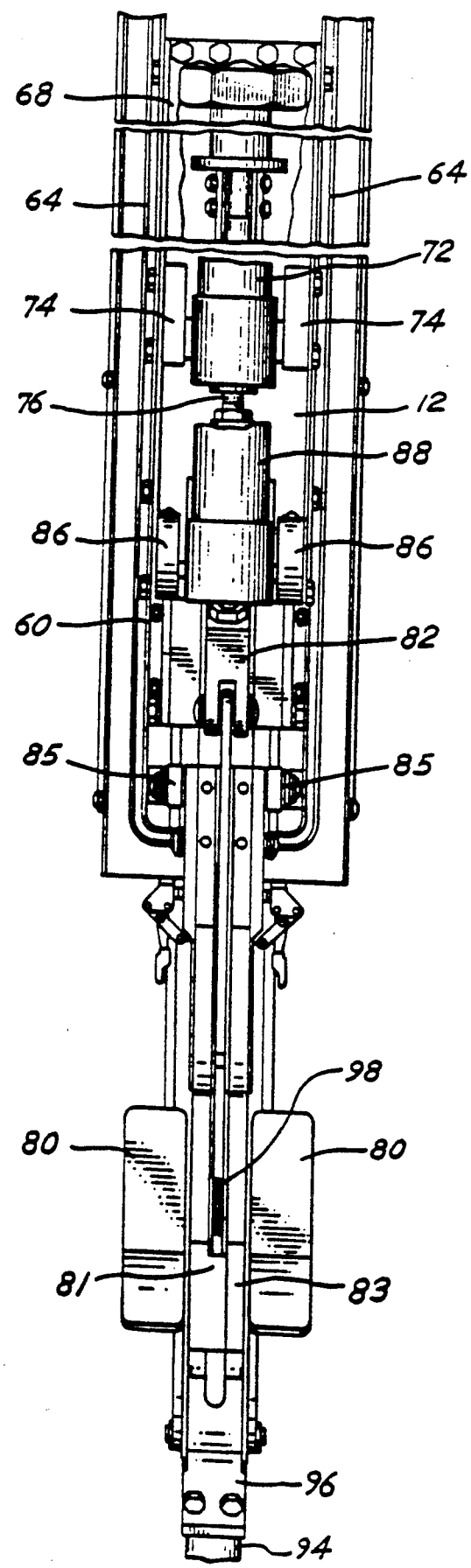
FIG. 4 is a front elevation of the clipper of FIG. 3.

FIGS. 3 and 4 illustrate in greater detail the construction of each clipper 12 mounted on each block 46. Each clipper 12 has a substantially identical construction. However, it should be noted that the construction of the clipper 12 as described is not a limiting feature of the invention. That is, any of a number of a type of double clippers may be utilized in the practice of the invention by mounting such clippers 12 on the blocks 46, for example. There is described, however, a preferred embodiment of a clipper 12.

Each clipper 12 is a douple clipper and includes a single main vertical mounting plate 60 in two vertically split, bolted sections. The plate 60 is attached to the block 46 and defines two vertical clip channels 62. The channels 62 are generally parallel. Each channel is designed to receive a separate clip. Each channel 62 has simultaneous operation. Each channel 62 defines a partial pathway for a clip driven by a punch 66. Thus, each channel 62 is partially open at its lower end to define a throat 27 for receipt of casing 24. The throat 27 is closed and defines a fully closed channel whenever a gate 85 is rotated to the closed position as described below. Die blocks 81, 83 are situated at the end of each channel 62. Clip rails 64 store and direct clips. The clips are directed through an appropriate window 75 into each clip channel 62.

Since the clipper 12 is a double clipper, it includes a pair of parallel channels 62 and a pair of rails 64 on the outside of those channels 62 for attachment simultaneously of two narrowly spaced U-shaped metal clips about casing 24. Thus, within each clip channel 62 is a slidable punch 66 driven in response to actuation by a pneumatic cylinder 68.

Mounted on the outside of the plate 60 and slidable in a vertical track 65 in the plate 60 is a carriage 70 comprised of a carriage block 71 and attached carriage drive plates 73, one on each side face of the block 71. Carriage 70 moves in response to actuation of a cylinder 72 having a bracket 74 which attaches the cylinder 72 to the plate 1000 in FIG. 3. A rod 76 extends from the cylinder 72 and is attached to the carriage 70 for effecting reciprocal motion of the carriage 70 between a projected and a retracted position. Carriage 70 includes a vertically downward extending arm 78 attached to the carriage drive plates 73 via pivots 75 and a transverse, lower cross member or ejection plate 80 which is supported by and pivotably attached via pivots 77 to the arm 78.

A pivotal gate mechanism 85 includes a drag link 89, which pivots about an axis 84, and is mounted on a forward bracket 82 of the carriage block 71. A cylinder support bracket 86 supports a cylinder 88 on the carriage 70. A rod 90 extending from the cylinder 88 engages, via a clovis 79, the pivotal gate mechanism 85 and rotates or pivots a leg 87 of the gate 85 between a retracted or throat open position and a casing gathering as well as channel forming position. The outline of the gate 85 is completed by the dotted and dashed line superimposed on leg 87 in FIG. 3. Extending rod 90 from cylinder 88 causes a gate drive link 808 to rotate about a drive link axis 810, which in turn carries the axis 84 through an arc. This action also causes the gate drag links 89 to also swing in an arc. These pivoting actions carry the gate assembly from a rotractus or throat open position to a casing gathering position. This action additionally carries gate channel plates (shown in dotted ouline on leg 87) into a clipping position and these form the remaining portions of the clip channels for the die supports and provide in combination with the die support plates a path for both the clips 95 and punchers 66 toward the die blocks 81, 83. The punch 66 drives a clip against an appropriate die block 81, 83 to form the clip about casing 24.

Supported by the plate 60 beneath the throat 27 is a knife cylinder 94 which drives a knife 96 through a slot 98 between die blocks 81, 83 which are retained by the plate 60. The knife 96 thus may be extended to engage and cut casing 24 which has been clipped and retained within the throat 27 of the clipper 12.

In operation, as an arm 44 of the platform 16 rotates about axis 14, one of the valves 56 is initially actuated by engaging an appropriate actuator cam 57. The first valve that is engated upon positioning of casing 24 within the throat 27 is the carriage cylinder 72. Actuation effects lowering the carriage 70 from the retracted to the projected position. Note that when carriage 70 is retracted, casing 24 can be easily positioned in throat 27. When carriage 70 is projected or lowered, however, the gate 85 and more particularly the leg 87 fits over throat 27 so casing 24 is retained. In review, when the carriage 70 is in the retracted position, the throat opening 27 is totally exposed thereby permitting placement of the filled casing 24 within the throat opening 27.

Lowering of the carriage 70 by operation of the carriage cylinder 72 is subsequently followed by actuation of the gate cylinder 88. This pivots the gate 85 about the axis 84 thereby compressing the casing 24. The casing 24 is firmly compressed so that a clip may be driven down the channel 62 about the casing 24.

In practice this is a double clipper, and a pair of clips are driven by actuation of the cylinder 68. The clips go down the channel 62 and are formed against dies defined in blocks 81, 83. Subsequently, the knife cylinder 94 is actuated to thereby operate the knife 96 and cut the casing 24 between the formed clips which have been fastened about the casing 24 by actuation of the punch 66.

Cam actuators 57 then engage the reset valves 58 and reverse the sequence of operation. Namely, the cylinder 94 is retracted. This retracts the knife 96. Subsequently the cylinder 68 is retracted to thereby retract the punches 66. Next, cylinder 88 is reversed to pivot gate 85 to the open position. Finally, the carriage cylinder 72 is actuated to retract the carriage 70. Retraction of the carriage 70 causes the discharge plate 80 to be elevated and engage the casing 24 or more particularly the link which has been formed causing the link to be discharged forward and outward from the rotating platform 16.

Note that the throat 27 extends radially outwardly from the platform 16. This is an important factor of the invention in that it permits direction of filled casing 24 from a tangent direction external the platform 16 into the clipper 12.

Located between the two members of the vertical mounting plate 60 is a single voided plate 91. This voider plate 91 is mounted on a pivot pin called a voider pivot. The plate 91 is biased in a clockwise direction so as to impinge in the area of the throat by a voider cylinder 902 and a constant air pressure to the blind end of the cylinder. The cylinder is attached to the rear face of the die support plate 60 by a mounting bracket 904. The rod end of the voider cylinder is also attached to the voider plate 91 by means of a clovis 906 and pivot pin. The upper rear surface of the voider plate 91 is extended to the right (FIG. 3) so as to provide a caming surface for operating valve 99.

In operation a regulating air supply is provided to the blind end of the voider cylinder. This biases the boider plate 91 in a clockwise direction about a voider pivot 908. In addition to the biasing function the constant air pressure also causes an angular displacement between the valve 99 operator and the upper caming surface of the voider plate 91. During operation, as the gate assembly is gathering casing the voider plate increases the interference between the casing and the gate at the center-most region of the clipper, between the die supports. This action causes product contained within the casing in the region to be displaced outwardly toward the gathering plates and in advance of the gathering plates arriving at the same location in relationship to the die supports. This product container within the casing is displaced from this corner first.

The gathering plates are also of a design such that inner most plates 872 provide for a more confined space at the rope area (the area of gathered casing) when fully closed in relation to the outer most plates 874. Thus, as viewed from the center outwardly when the gate assembly is closed the space provided is of a divergent configuration.

A slot in the voider plate 91 also provides a guide for the knife 96.

An important feature of the invention is the utilization of the limit valve 99 which senses the presence of casing material between the gate 85 and plate 60. That is, the compressed casing 24 will cause voider plates 91 positioned adjacent the die blocks 81, 83 to translate into engagement with a limit valve 99. The limit valve 99 must be actuated in order to open the fluid pressure line to the cylinder 68. The gathering plates 91 will only move or be translated to actuate the described valve 99 in the event there is sufficient casing 24 in the opening between the gathering plate 60 and the movable gathering plate 85.

D. Casing Feed Construction

Figure 5:
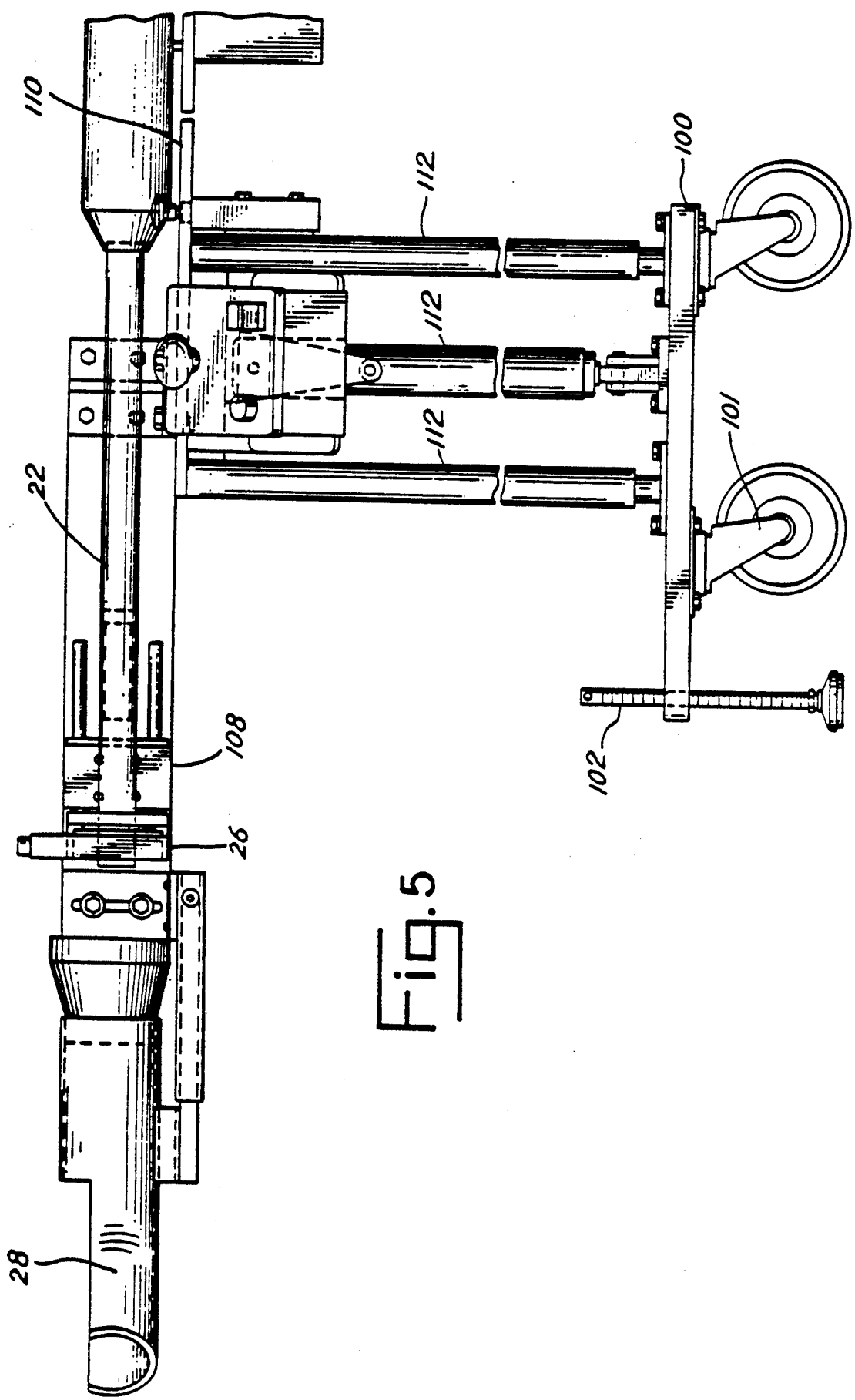
FIG. 5 is a side elevation of the means for feeding casing material associated with the packaging device of FIG. 1.
Figure 6:
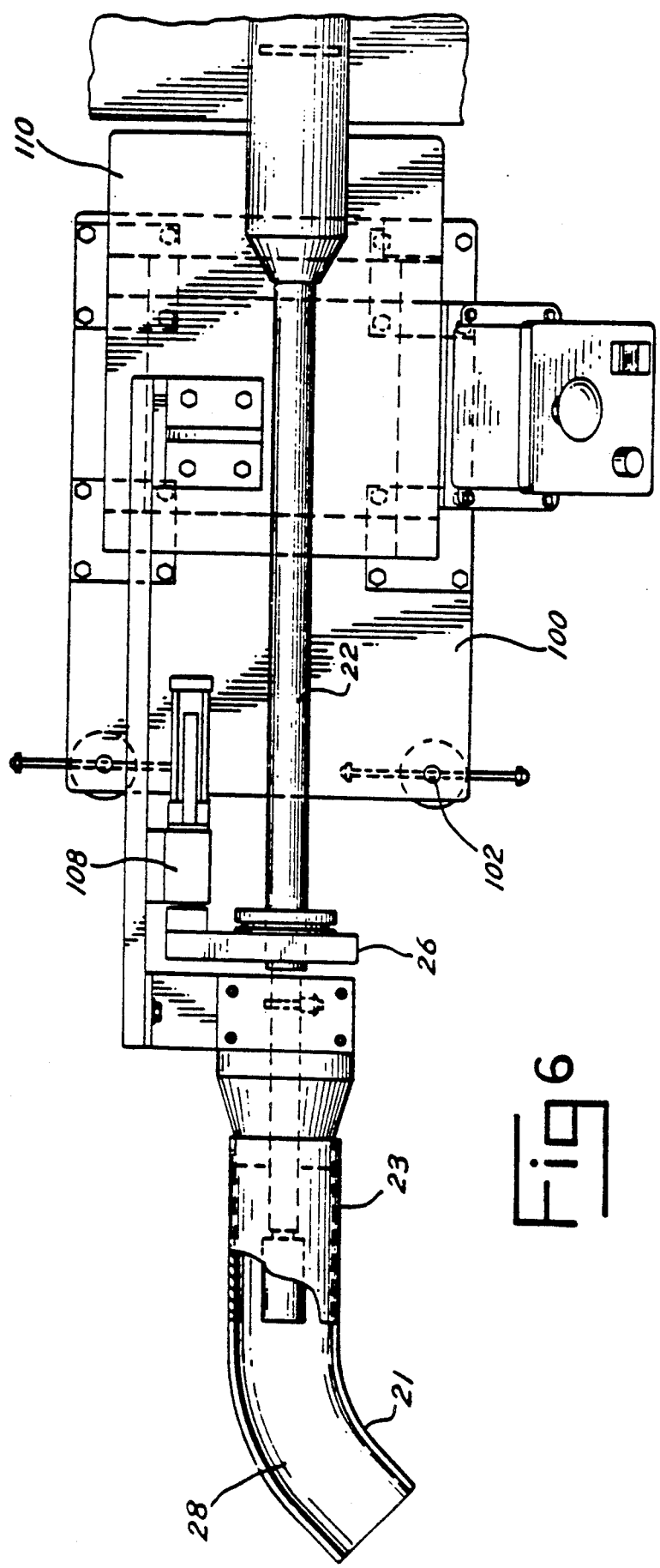
FIG. 6 is a top plan view of the means for feeding shown in FIG. 5.

FIGS. 5 and 6 illustrate in greater detail the casing feed construction 18 which includes the horn 22 and the channel or chute 28. The construction 18 is mounted on a frame 100 supported on a wheeled carriage 101. A foot 102 is provided to hold the carriage 101 and frame 100 in a fixed position relative to the other components of the system.

The horn 22 mounted on the end of a stuffing mechanism 20 from which product is discharged. The feed construction 18 includes a brake mechanism 26 such as known to those skilled in the art. Brake mechanism 26 is supported by a bracket 108 supported by or on a plate 110. The plate 110 is adjustably supported by adjustable legs 112 and adjusted via a linear actuator 114.

Shirred casing 24 is fitted over the horn 22. The forward end of the casing 24 is closed or sealed and the brake 26 is then moved or brought into cooperation with the casing 24 against the horn 22. Product which flows through the horn 22 will flow into the casing 24 and withdraw the casing 24 from the horn 22 in a controlled manner as determined by the brake 26. The filled casing 24 will then flow down the arcuate chute or channel 28. Note that the channel or chute 28 has a semi-cylindrical shape or cross section at its discharge or arcuate end 21 or the chute 28 which is open at the top; whereas the forward cylindrical straight portion 23 of the chute 28 totally encircles or encloses the product.

It is possible to vary the construction of the first preferred embodiment while maintaining the functions and attributes as described. The property right established in the first preferred embodiment is therefore to be limited only by the claims and equivalents.

II. The Embodiment of FIGS. 7-24

A. General Description

Referring to FIGS. 7-29, a second preferred embodiment of the invention deletes approximately seventy-five percent of the components of the first preferred embodiment. As in FIG. 7, an improved packing device 201 includes a mounting assembly 210 having supported thereon a plurality of clippers 212. As with the first preferred device, each clipper 212 is normally positioned at an equal radial distance from a vertical rotation axis 214 (see FIG. 8). The axis 214 of the second device 201 is associated with a mounting assembly central support post 232. As with the first preferred embodiment, a casing feed mechanism 218 directs product from a stuffing machine 220 through a horn 222 and a casing brake 226 into advancing casing, and by a chute 228 into the device 201, tangentially with respect to the clippers 212 and axis 214.

The filled casing 224 then extends into the throat 227 of one of the clippers 212 as that clipper 212 moves along a circular path about the axis 214. That clipper 212 gathers the casing material, applies two spaced metal clips about the gathered casing, severs the casing 24 between the clips (if desired) and ultimately releases the formed casing product or link 225 for discharge from the device 220. Each clipper 212 so operates, as it rotates past the chute 228.

As can be seen, the device 201 performs substantially like the device of the first embodiment. The clippers 212 operate in the same sequence as clippers 12, and are variable in the same numbers as the clippers 12. The table or platform 16 is eliminated; only a splash pan 216 remains (see FIG. 8 only; deleted elsewhere for ease of illustration).

B. Mounting Assembly

FIG. 8 is a side elevation of the mounting assembly 210 and the clippers 212. FIG. 9 is a perspective view of the same. As shown, the mounting assembly 210 includes a support frame 230 having a central support post assembly 232. The central support assembly 232 includes both a central, fixed portion and an outer, rotating portion. The central support post assembly 232 is supported vertically upwardly by means of the frame 230.

The frame 230 includes, as in FIGS. 9, 11 and 12, four upright I-beam segments 301, 302, 303, 304 joined in a star pattern, defined as a pattern in which each I-beam segment has an inner end abutting a side of an adjacent I-beam segment. Thus, the segments 301, 302, 303, 304 form a square, central base 305 (dotted in FIG. 11) around a central opening 306, for support of the central support post assembly 232. A motor mounting bracket 307 is atop I-beam 304, and a brake caliper mounting bracket 308 is atop I-beam 303. The inner end 309 of the brake caliper mounting bracket 308 is angled to hold a disk brake caliper 310 (see FIGS. 8, 9) in an orientation tangent to the vertical rotation axis 214.

Referring to FIG. 10, the central support post assembly 232 includes an inner, static central column 321 with a static, upper, reduced diameter column portion 322. The upper column portion 322 extends upward to a rotary union inner member 323 (see FIG. 13), which completes the vertical extent of the post 323. A dynamic, outer column 324 is mounted by bearings 325, 326 on the central column 321, and is rotatable relative to the central column 321 about the vertical rotation axis 214 (see FIG. 8). The outer column 324 extend upward to a rotary union outer member 327, which is directly, horizontally outward of the rotary union inner member 323.

Bearing 326 is positioned at the base of the reduced diameter portion 322 of the central column 321, and separates the columns 324, 321. The dynamic, outer column 324 extends downward past the bearing 326 in a skirt 328 along the column portion 321. Bearing 325, an angular contact bearing, is positioned between the columns 321, 324 just below the rotary union. An annular space exists between the columns 321, 324 and extends from the rotary union to the bottom of the reduced diameter column portion 322. The space is filled with lubricant, and lubricates the bearings 325, 326. A drain opening 329 is connected via an elbow to a flexible sight tube 317 of oil level, and draining, for visual verification.

A drive sprocket 330 is fastened in a horizontal plane at the bottom of the skirt 328. A chain 331 extends from a drive gear 332 (see FIG. 8) atop a transmission 238 (see FIG. 9) operatively connected with a motor 236 (see FIGS. 8, 9) mounted atop the motor mount 308. The motor 236, a variable speed motor, drives the outer column 324 in rotation, through the chain drive constituted by the drive gear 332, chain 331 and sprocket 330.

The disk brake caliper 310 extends toward the outer column 324, and brakes a disk 334. The disk 334 is fastened between the skirt 328 and outer column 324, in a horizontal plane, above the sprocket 330. Thus, the motor 236 drives the outer column 324, and as necessary, a brake mechanism consisting of the disk 334 and caliper 310 brakes the outer column 324.

Referring to FIGS. 25 and 26, each of the brake disk 334 and sprocket 330 define a plurality of hose line openings such as openings 337, 339.

Figure 13:
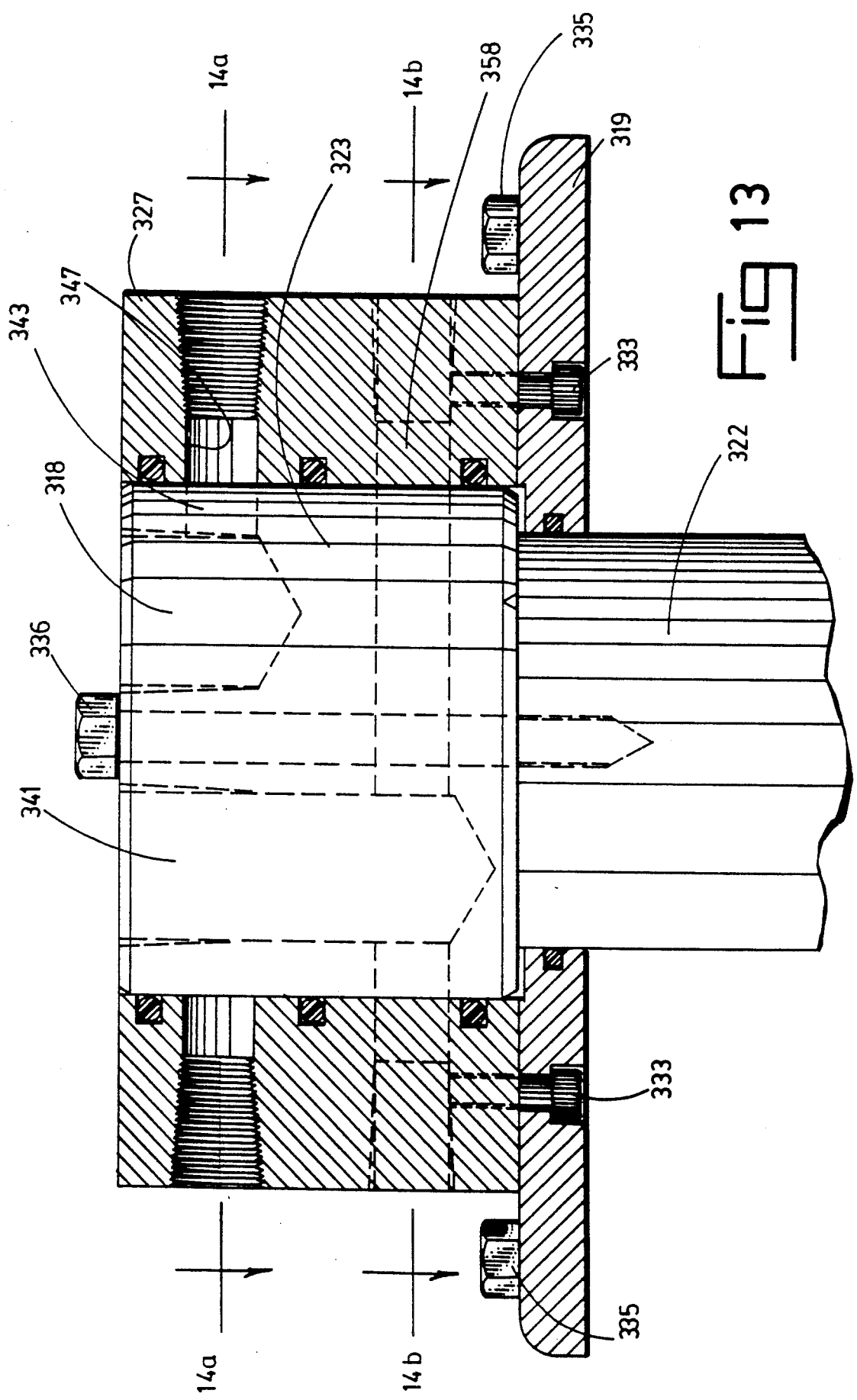
FIG. 13 is a partial section view of a rotary union atop the center column of FIG. 10, which is provided to distribute pressurized air from an overhead source of supply to the moving clippers of the machine.
Figure 14:
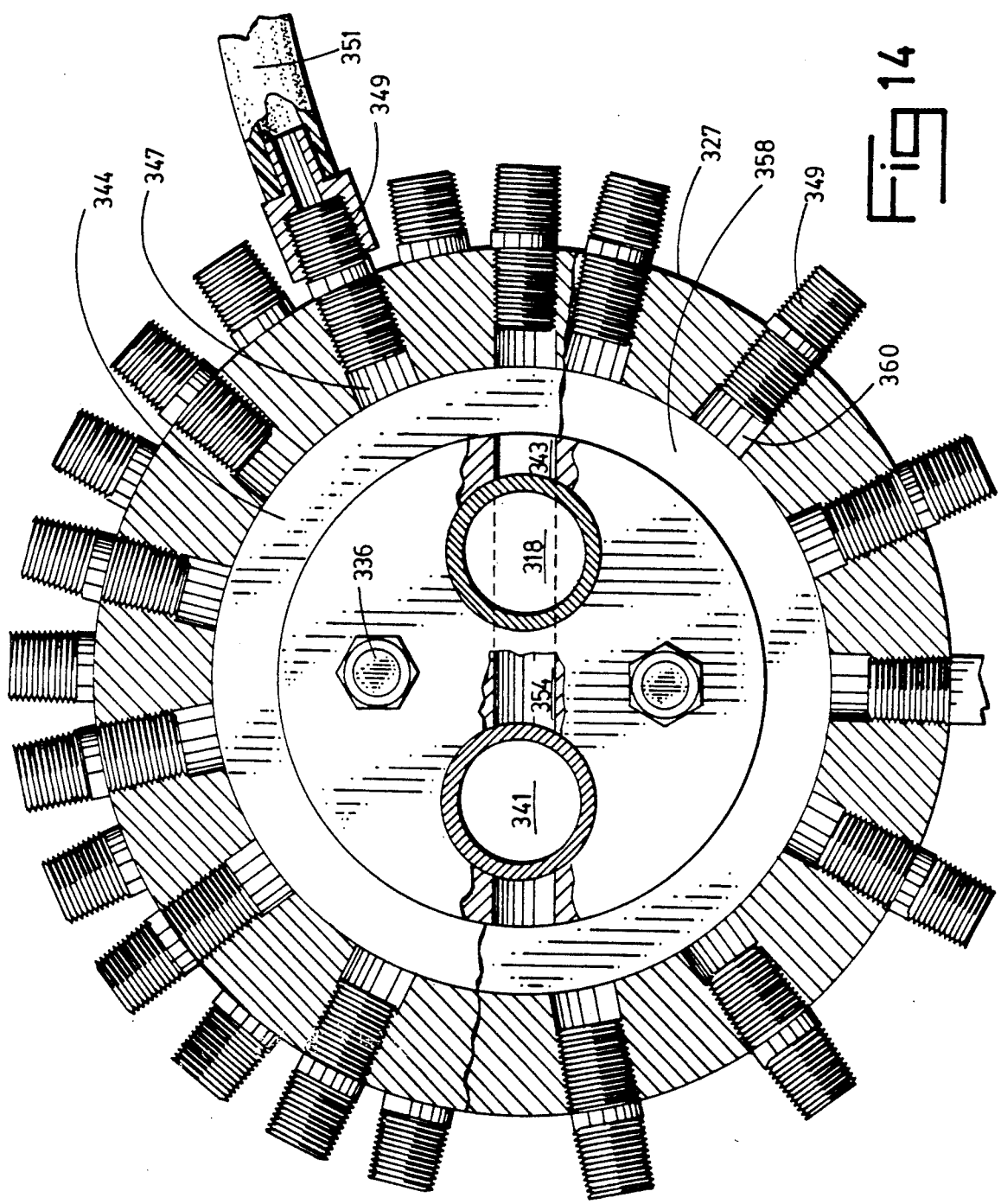
FIG. 14 is a section view of the rotary union of FIG. 13 taken from plan view perspective, including a first partial section taken from along line 14a—14a in FIG. 13 and included in the upper half of FIG. 14, and a second partial cross section taken from along line 14b—14b in FIG. 13 and shown in the lower half of FIG. 14.

The rotary union inner member 323 and rotary union outer member 327 cooperate to distribute pressurized fluid such as air from a remote overhead source (not shown) to the moving clippers 212. Together, they form a rotary union member and one possible form of a means for receiving and distributing pressurized fluid, as stated. Referring to FIG. 13, the inner member 323 is fastened to the portion 322 of the central column 321, as by a fastener 336. The outer member 327 is fastened to a plate 319 by fasteners such as 333, and the plate 319 is fastened (see FIG. 8) to outer column 324 as by fasteners 335. As in FIG. 14, and in dotted line in FIG. 13, the inner member 323 defines two independent receiving ports, i.e., first and second receiving ports 318, 341 for receiving pressurized fluid from the overhead source. A first transfer channel 343 extends transversely within the inner member 323, from the first receiving port 318 to the exterior of the inner member 323. The first transfer channel 343 does not intersect the second receiving port 341, but only the first receiving port 318. The first transfer channel 343 and first receiving port 318, and associated members, thereby form a first network for fluid distribution, independent of the second receiving port 341 and its network (to be described). A first fluid distribution channel, in the form of an annular groove 344 along the inner surface of the rotary union outer member 327, distributes fluid from the first transfer channel 343 to a plurality of first distribution ports such as ports 347. A first distribution port exists for each clipper 212. As shown in FIG. 14, a double nipple such as nipple 349 is screwed into each port such as 347. A hose or pipe such as hose 351 extend from and is fastened to each nipple 349, to a mechanism on a clipper 212. As shown, the hose 351 extends to valves 364 (see FIG. 10) through the openings 337, 339 of the brake disk 334 and sprocket 330, and then back throug similar openings and outward along wedge members 338 (to be described) to a clip driving cylinder 352 (see FIG. 15).

A second transfer channel 354 extends transversely within the inner member 323, from the second receiving port 341 to the exterior of the inner member 323. The second transfer channel 354 does not intersect the first receiving port 318, but only the second receivingn port 341. The second transfer channel 354 and second receiving port 341, and associated members, thereby form a second network for fluid distribution, independent of the first network. A second fluid distribution channel, in the form of an annular groove 358 along the inner surface of the outer member 327, spaced down from the first annular groove 344, distributes fluid from the transfer channel 354 to a plurality of second distribution ports such as port 360. A second distribution port exists for each clipper 212. As shown in FIG. 14, a double nipple such as another nipple 349 is screwed into each port such as 360. A hose or pipe such as another hose (not shown) extends from and is fastened to each nipple 349, to valves 364 through openings 337, 339, and back, and then to a mechanism on a clipper 212. The hoses from the nipples 349 associated with the second ports such as 360 extend to the fluid actuated mechanisms of the clipper 212 other than the clip driving cylinders 352 (see FIG. 15). Because the grooves 344, 358 are continuous, all distribution ports 347, 360 stay continuously in communication with the remote source of pressurized fluid. Fluid is continuously available as a source of power.

As most preferred, all mechanisms of the second preferred device are pneumatic, and the source of pressurized fluid is a source of pressurized air. Valves 364 sweep past actuators (not shown) which cause the valves 364 to trigger the mechanisms of the second preferred device at rotational locations as desired, and as described in relation to the first embodiment. Because of the use of pneumatic mechanisms, cleanliness in the handling of food products is promoted.

Referring to FIGS. 8, 9, 10, 16, 17, 18, 19 (note the reversal of FIG. 19 relative to FIG. 16), and especially to FIG. 9, the clippers 212 are maintained in position by supporting wedge members such as member 338. The wedge members 338 significantly improve the second preferred embodiment of the invention by mounting the clippers 212 in true radial lines, for radial adjustment along such true radial lines, as opposed to the offset mounting of the first preferred embodiment (see FIG. 1).

Figure 24:
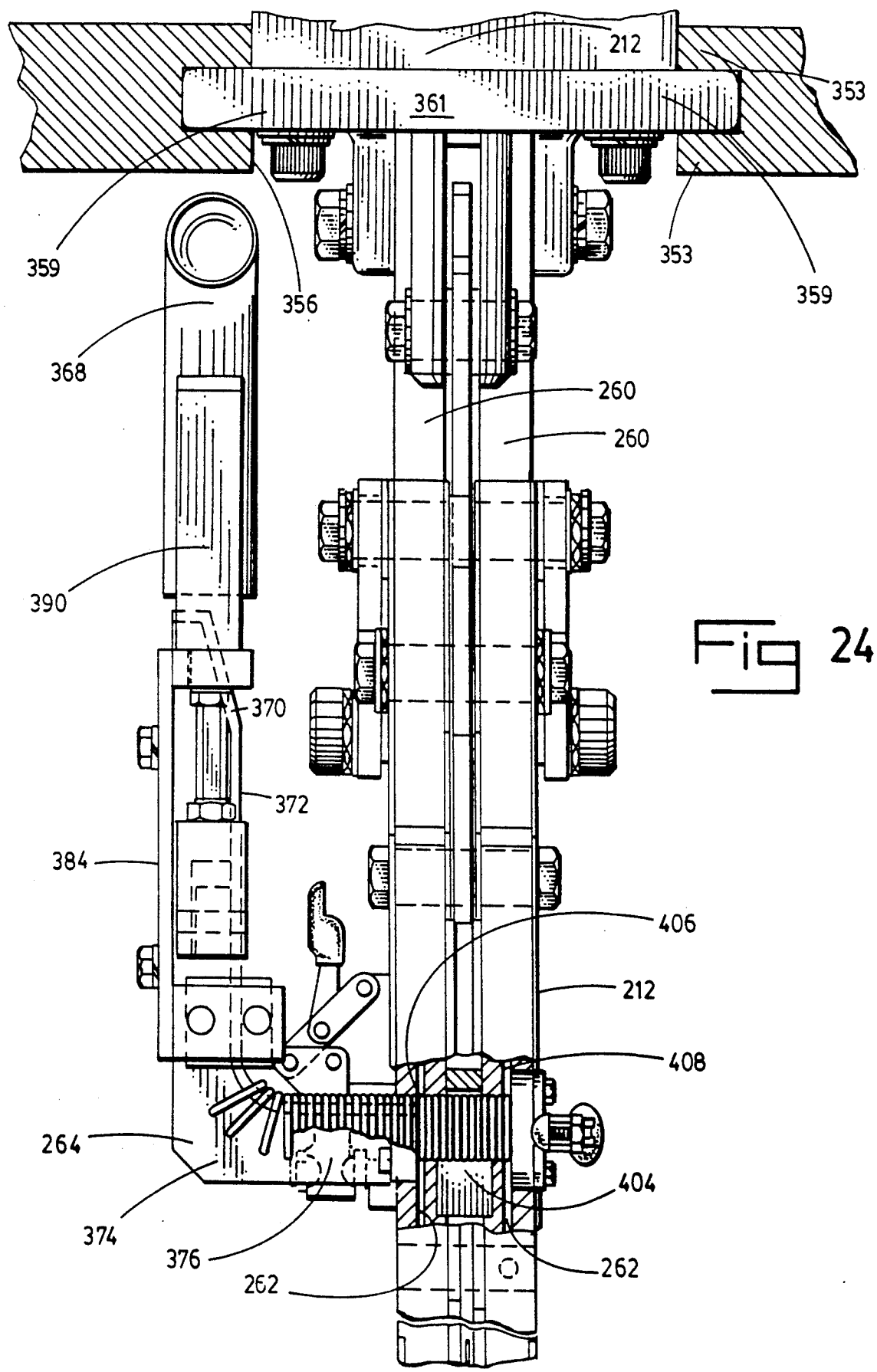
FIG. 24 is an outer end elevation view of the clipper of FIG. 15.
Figure 37:
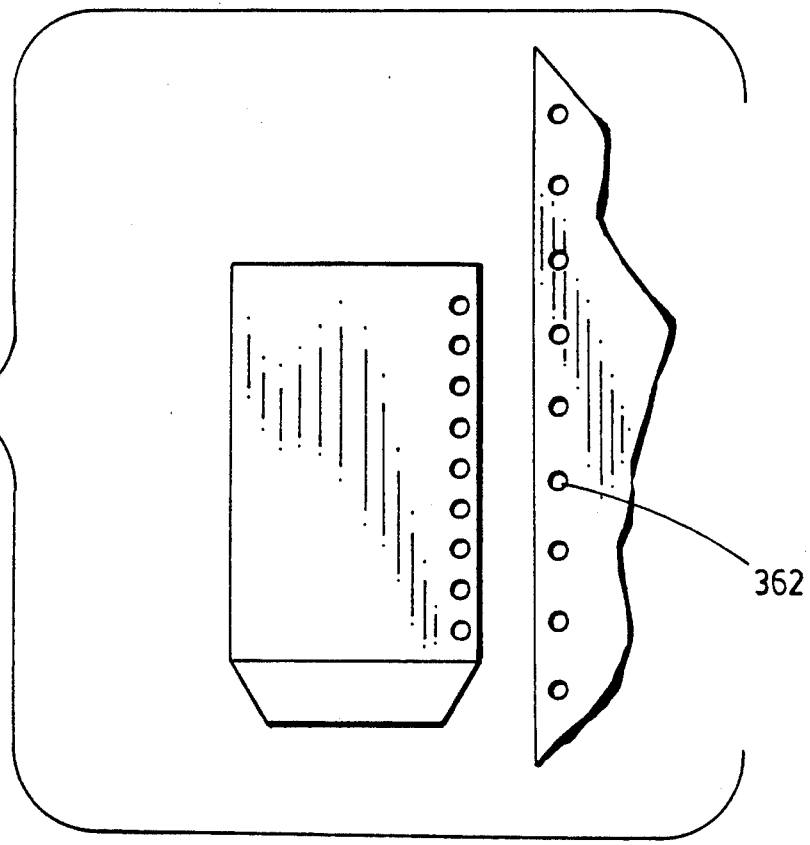
FIG. 37 is a diagram of clipper, wedge openings and their cooperation.

Upright, narrow, inner plates 340 (see FIGS. 10, 16-19) of the wedge members 338 are pinned to the outer column 232. An upright, radially extending support 342 as in FIGS. 16-19 extends from attachment to the inner plate 340 to an elongated outer periphery 345. A horizontally planar wedge plate 346 tops the support 342, and extends radially outwardly from a narrow inner plate tip 348 to a wide, arcuate outer plate fringe 350. Along each radially extending side of the wedge plate 346, a pair of vertically spaced, radially extending rails 353 define a radially extending slide channel 355 between the rails 353, as seen especially in FIG. 18. As in FIG. 9, the wedge plates 346 extend arcurately, circumferentially, to define uniformly narrow, radially extending clipper passages such as 357. Referring to FIG. 24, flanges 359 along the clippers 212, formed by a plate 361, ride in the slide channel 355, and the clippers 212 are slidable in the clipper passages 357. Each clipper 212 is individually movable radially for adjustment of product length, or elimination of clippers from action. While in use, each clipper is pinned in a clipper passage 357 by pins (not shown) placed in selected pin openings 362 along each set of rails 353, such openings being shown by example in FIG. 19. As in FIG. 37, closely spaced openings on the clipper flanges 359 mate with the more distantly spaced openings 362 to provide clipper placement as desired within one sixteenth inch.

Referring to FIGS. 30-33 tie straps 498 are placed against surfaces 350 of the wedge members and pass from a tie strap connecting hole in one plate 346 to the tie strap connecting hole in the next plate 346 closest to it. Each tie strap is placed across the opening at the end of plate 346 and clipper passage 357 such as to insure proper passage width of passage 357 and also to provide a stop at the end of the wedge members.

Radial movement of the clipper 212 does not require X-axis, Y-axis movement of the machine in relation to the casing feed mechanism 218 because the clipper 212 are movable along true radial lines. As a result of such movement, the chute 228 can be simply extended toward the machine, and the tangent entry of product into the machine will be substantially maintained.

C. Clipper Construction

FIGS. 15, 21-24, 27-30 illustrate in great detail the construction of each clipper 212 and its unique components. Each clipper 212 has a substantially identical construction. However, it should be noted that the construction of the clipper 212 as described is not a limiting feature of the mounting assembly or other assemblies of the second preferred embodiment. That is, any of a number of a type of double clippers may be utilized in the practice of the second preferred embodiment by mounting such clippers 212 on the wedge members 338, for example. There is described, however, the second preferred embodiment of a clipper, clipper 212.

Figure 15:
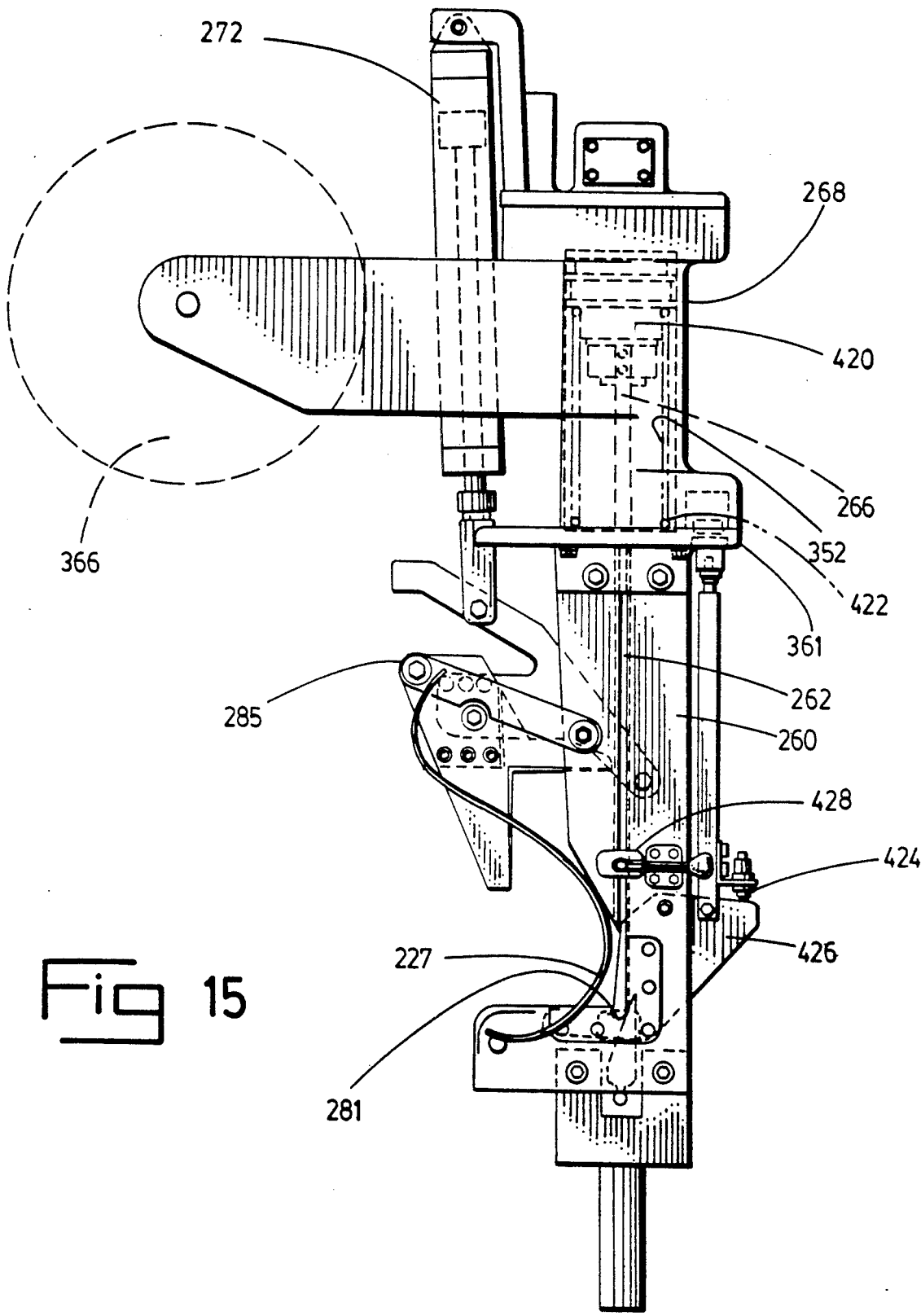
FIG. 15 is a side elevation view of a typical clipper of the second preferred machine.

Each clipper 212 is a double clipper and includes a single main vertical mounting unit of two die supports 260 (see FIGS. 15, 24). The mounting plate 260 is attached to the bracket 361 comprised of a horizontal plate and two underlying, space vertical members (see also FIG. 24) and defines two vertical clip channels 262. The channels 262 are generally parallel. Each channel 262 is designed to receive a separate clip, has simultaneous operation, and defines a partial pathway for a clip driven by a punch 266. Thus, each channel 262 is partially open at its lower end to define a throat 227 for receipt of casing 224. The throat 227 is closed and defines a fully closed channel whenever a gate mechanism 285 is rotated to the closed position as described below. Die blocks such as 281 are situated at the end of each channel 262. A single clip rail 264 (see FIG. 24) directs clips from a clip storage as described below through an appropriate window into each clip channel 262.

While the clipper 212 is a double clipper, it includes the single rail 264 on the outside of the channels 262 for attachment simultaneously of two narrowly spaced U-shaped metal clips about casing 24.

Referring to FIG. 8, a clip reel 366 mounted on each clipper 212 above the wedge members 338 feeds spooled clips into clip input tubes 368. As in FIG. 24, the clip input tube 368 is angled from the horizontal to the vertical, and terminates just above the clip rail 264. A ramped portion 370 of the clip rail 264 increases in width, and eases entry of the clips onto the clip rail 264. A straight, vertical clip pusher portion 372 of the clip rail continues to a right angle 374, where the clip rail 264 ends in a horizontal clip rail portion 376. Clips as shown travel down the clip rail 264.

Referring to FIG. 23, the clip rail 264 is joined to a mounting block 378, which is aligned on pins 380 against the side of the main vertical mounting plate 260. A toggled, manual clamp mechanism 382 releasably secures the mounting block 378, and thereby the rail 264, to the side of the main mounting plate 260. Rapid change of the rail and attached structure, to be described, is provided in the event of need for repair.

Figure 20:
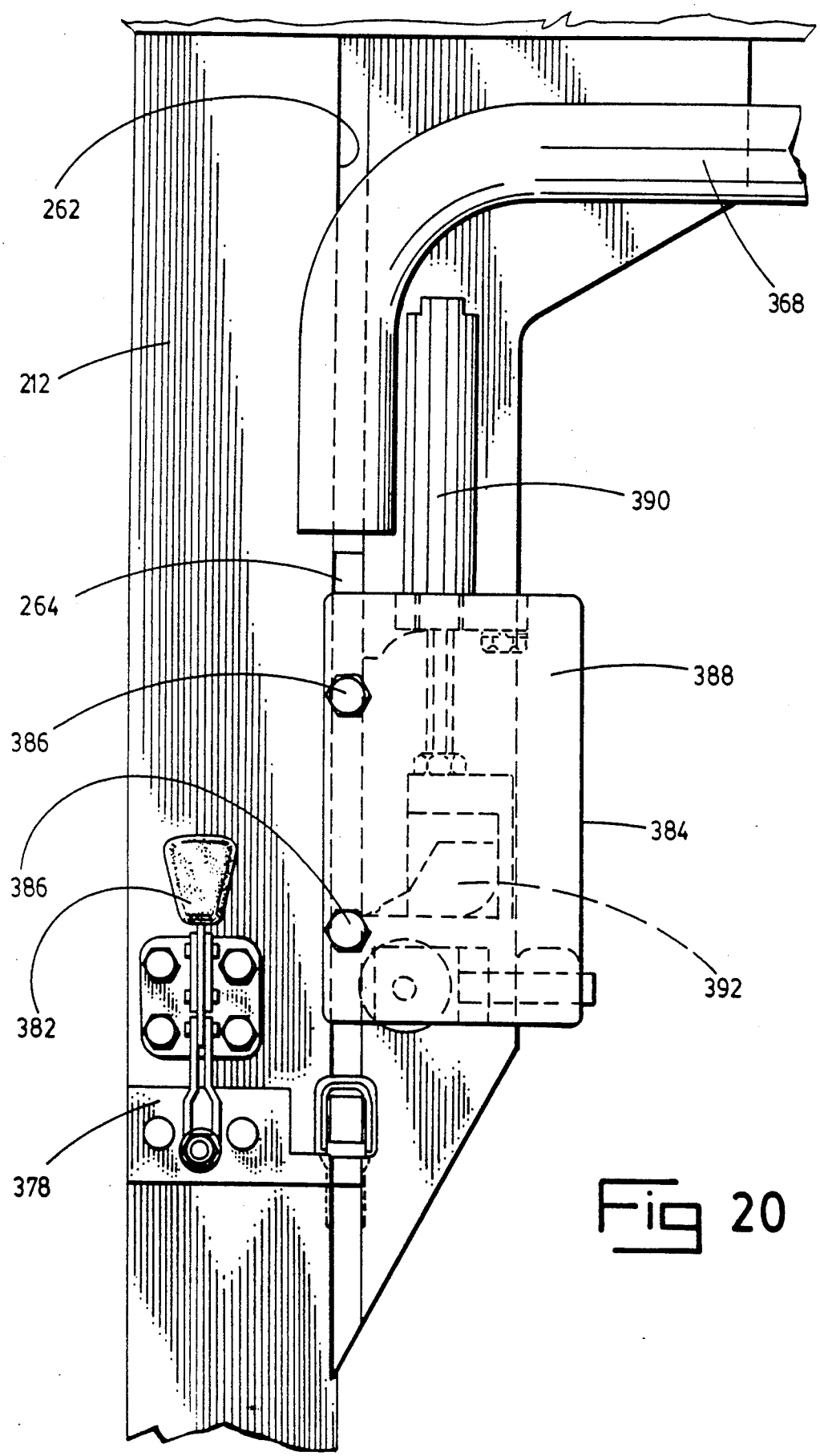
FIG. 20 is a detailed elevation view of the clipper of FIG. 15 from the side opposite that shown in FIG. 15, disclosing the clip feed mechanism of the clipper.

Referring to FIGS. 20-22, a clip pusher assembly 384 is mounted by bolts 386 (see FIG. 20) to the clip rail 264. A support plate 388 supports a vertically-acting, pneumatic clip pusher cylinder 390, which drives a pawl 392. The pawl 392 contacts the legs of clips as they move along the rail 264. Upward retraction of a rod 394 (see FIG. 21) of the cylinder 390 ratchets the pawl 392 upward along the clips. Downward advancement of the rod 394 causes the pawl 392 to pivot inward against the legs of clips about a pawl pivot 396. So pivoted, the pawl 392 catches between the legs of the clips, and drives them forward, downward and into the clipper 212. A wheel 398 extends horizontally, adjacent the bottom, forward position of the pawl 392, is spring-biased horizontally toward the clips, and is mounted for rotation in one direction (clockwise in FIG. 21) only. The wheel 398 advances in rotation as the pawl 392 advances, and by its pressure on the clips, retains the clips against rearward movement during rearward movement of the pawl 392. Clips are maintained at all times under the forward-directed force of the pawl 392 or the same force as maintained by the wheel 398. A leaf spring 698 also contacts the clips, and aids in prevention of rearward movement of the clips.

Figure 34:
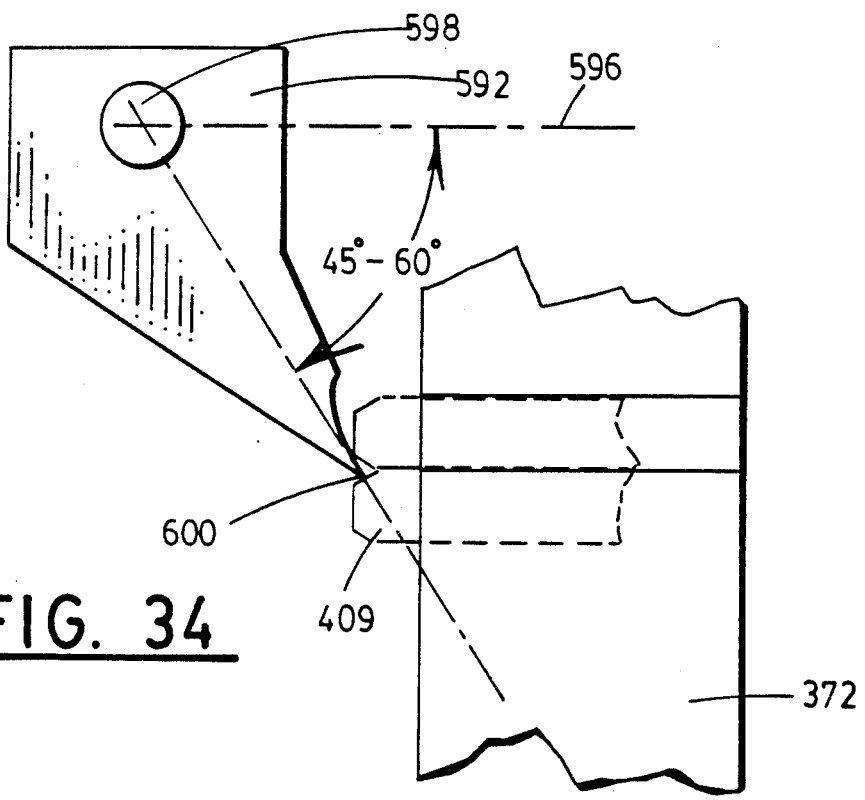
FIG. 34 is a diagram of a most preferred clip pusher pawl of the second preferred embodiment.
Figure 35:
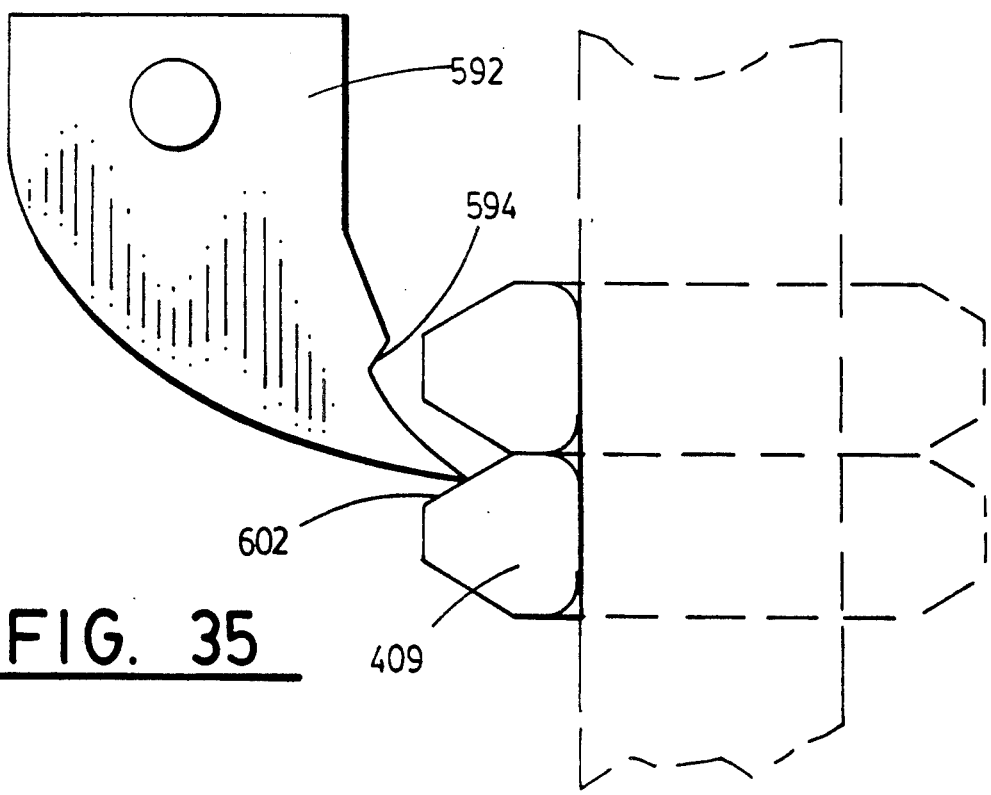
FIG. 35 is a further diagram of the most preferred pawl.
Figure 36:
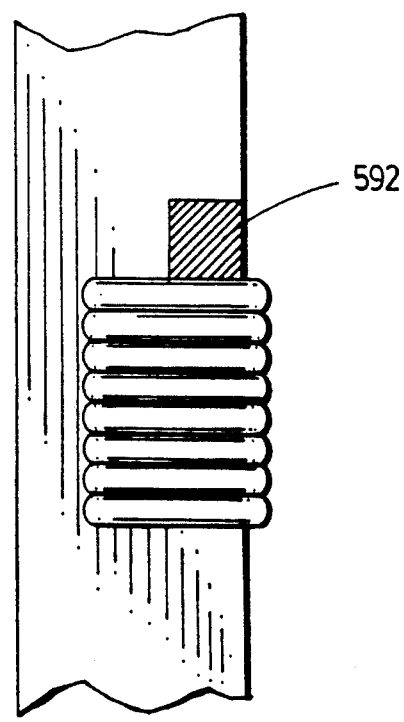
FIG. 36 is a still further diagram of the most preferred pawl, at a right angle to FIGS. 34 and 35.

Referring to FIGS. 34 and 35, a most preferred pawl 592 includes the particular advantages of an access of pivoting aligned relative to the clip pusher portion 372 of the clip rail in a parallel line with the access of the cylinder 390, and undercut 594 immediately adjacent the tip of the preferred pawl 592, and an angle as will be described. A reference line 596 is perpendicular to the clip pusher portion 372 of the clip rail. The angle of the most preferred pawl 592 is an angle relative to the reference line 596 of a reference line 598 passing between the pivot axis of the pawl 592 and the tip 600 of the pawl. The included angle between referece lines 596 and 598 is in the range of 45° to 60°. As in FIG. 36, the most preferred pawl 592, while it pushes along the legs of the clips, pushes against the section of the legs closely adjacent the top of the clips, to prevent pivoting of the clips about their tops and possible wedging of the clips against other surfaces of the machinery. Also with the most preferred pawl 592, the clutch with its wheel 398 is eliminated.

With elimination of the clutch, timing of the motion of the clip pusher and the punches 266 is coordinated. Release of pressure of the clip pusher assembly 384 during retraction of the cylinder 390 and movement of the pawl 592 away from the area of the clip rail portion 376 occurs only during the time in which punches 266 have passed a window 400 adjacent the horizontal clip rail portion 376. Pressure is reapplied in advance of the punches 266 retracting past the window 400. Movement of the gates causes reactuation of the cylinder 390 to advance the pawl 592 such that before the punches 266 retract past the window 400, pressure is applied to the clips by the pawl 592.

As clips leave the rail 294, they enter into the clip channels 262 through a window 400 (see FIG. 23). Within the main vertical mounting plate 260, a short rail 402 extends between the two clip channels 262, within a chamber 404 aligned with the window 400. An intermediate clip guide 892 is positioned above the rail 402. A ramped leading edge tops the window 400. The size and configuration of the short rail 402, the chamber 404 and the channels 262 adjacent the chamber 404 are closely maintained for proper performance of the clipper 212. As shown in FIG. 24, the clips bridge the channels 262 as they await action of the punches 266. A clip 406 is suspended in a first channel 262 and a clip 408 is suspended in the second channel 262 at the intersection of the chamber 404 with the channels 262, until punches 266 drive the clips 406, 408 forward and downward, for clipping.

As fed down the rail 264, the clips are joined along their spines, in the manner of paper clips, by a glue or tape. Polyester tape has been found most desirable for its clean breaks by the clippers 212 and lack of residue within the clippers 212. Suspension of the clips 406, 408 occurs despite the fact that as the clips are driven in pairs by the punches 266, the remaining clips are separated until any clip in the position of clip 408 is not connected to any other clip, and any clip in the position of clip 406 is connected only to incoming clips. If pressure were released by absence of the wheel 398, except with pawl 592 and proper sequencing of the pawl 592 and punches 266, clip 408 would likely fall from a suspended position and clip 406 would likely be misaligned. Thus, an important function of the clip pusher mechanism 384, including especially pawl 392 and wheel 398, is maintenance of constant pressure on the incoming clips against clips suspended in the clip channels 262.

Accurate placement of clips in the clip channels 262 is necessary to assure the punches 266 do not sever or damage the clips, residue of damage to block the clip channels 262. Accurate placement is assured by close control of spacing, as noted above. As most preferred, with Tipper Tie ® Trapezoidal ™ clips, the length of the short rail 402 is maintained equal to an integer number of clips, assuming each such clip is the minimum dimension permitted under the manufacturing tolerance, plus or minus the manufacturing tolerance times one. An integer number of seven is highly preferred. Also, the height of the chamber 404 above the short rail 402, referred to hereafter as the "headroom", is closely maintained to prevent locking, or wedging, of adjacent clips against each other due to vertical movement of the clips while under pressure of the pawl 392 and wheel 398. Clips with rectangular cross-sections along their spines should suffer little risk of locking. Clips with circular cross-sections along their spines present great risk of locking. Slight vertical movement will wedge such clips. Tipper Tie ® trapezoidal clips present little risk of wedging when the heardroom is maintained at less than half the vertical dimension between the bottom of the clip and the point along the periphery of the clip where the clip narrows.

A chamfer 410 is placed on both sides 412, the top 414 and both angled portions 416 of the short rail 402, for centering the clips onto the short rail 402. Adjacent the short rail, the clip channels 262 have close tolerances relative to the punches 266; neither the punches 266 nor the clip channels 262 are maintained closely parallel to each other or dimensioned to prevent punch deflection.

Referring again to FIG. 15, the punches 266 are driven by a pneumatic punch drive cylinder 268. Punches 266 are connected directly to a piston 420 of the punch drive cylinder 268. Return of the piston 420 upward is provided by a return spring 422 acting between the punch cylinder piston 420 and the punch drive cylinder 268.

A gathering gate cylinder 272 drives a gathering gate mechanism 285. Coordination of the punch and gate movements is provided by pneumatic controls, including a valve 424 positioned to sense movement of a plate 426 under action of the gathering mechanism 285. Gathering trips the valve 424, signalling for actuation of the clipper punch drive cylinder 268.

To free jams, if jams are encountered, a toggled backplate 428 (see also FIG. 23) is positioned to abut clips such as clip 408 in the clip channel 262 opposite the clip rail 264, and when removed, provides quick access to the chamber 404 within which the short rail 402 resides.

For production ejection, an ejection strap 700 is fastened pivotably to the gate and die support. For ease of passage of the gate in closing, the die support is well-rounded, at 702. The strap flexes out of the throat 227 when the gate is lowered, and flexes to eject product when the gate is raised.

What is cliamed is:

1. An improved packaging device for filling flexible casing and sealing discrete lengths of filled casing comprising, in combination:
   a clipper mounting assembly including a floor mounted frame and a plurality of separate and distinct wedge members supported by the frame, said wedge members rotatable in a horizontal plane relative to the frame;

a plurality of clippers mounted on the plurality of wedge members, each clipper spaced radially from a vertical axis through the center of the plurality of wedge members, each clipper including pressurized-fluid-driven means for attaching a clip about filled casing by gathering said casing and subsequently forming a U-shaped clip about the gathered casing with cooperative punch and die means, each of said clippers extending radially outwardly from the vertical axis through the center of the wedge members;

means for continuously rotating the wedge members and clippers mounted thereon about said axis in a uniform direction;

means positioned at one side of the wedge members for feeding filled casing sequentially into each clipper as each one of said clippers moves, by wedge member rotation, past the means for feeding; and means for sequentially operating the clippers as the wedge members are rotated whereby as each clipper is in position to receive filled casing as it moves past the means for feeding, said clipper operates to subsequently gather the casing, to form a U-shaped metal clip about the casing, to separate links of casing, to release the casing link and to discharge the filled link from the device.

2. The device of claim 1 wherein the clippers are each individually movable in the radial direction along a radius from the vertical axis through the center of the plurality of wedge members.

3. The device of claim 1 wherein at least one clipper includes a body, a clip channel in the body, a punch in the clip channel movable between a projected and a retracted position, a die at the end of the clip channel adjacent the platform, means for directing a clip into the channel, a movable gathering gate carriage mounted on the body and movable between a projected position adjacent the die and a retracted position; said carriage including a gate pivotal between a casing gathering position and a casing release position, and means for driving the punch, the carriage and the gate between their respective extreme positions.

4. The device of claim 1 wherein the clipper mounting assembly further comprises:

a mounting assembly central support post assembly, supported vertically upwardly by the floor mounted frame, including an inner, static central column defining the vertical axis through the center of the wedge members and a dynamic outer column mounted on the inner, static central column for rotation relative to the inner, static central column about the vertical axis, the wedge members being mounted on the dynamic outer column.

5. The device of claim 4 wherein the inner, static central column includes a static, upper column portion, and wherein a bearing is positioned at the base of the upper column portion, the bearing separating the dynamic, outer column and the inner, static central column, and wherein an annular space exists between the dynamic, outer column and the static, upper, reduced diameter column portion, the annular space being filled with lubricant.

6. The device of claim 1 or claim 5 wherein the device further comprises:

a rotary union including a rotary union inner member and a rotary union outer member, for receiving and distributing pressurized fluid to the clippers, the rotary union inner member defining at least one receiving port and at least one network for fluid distribution, the rotary union outer member defining at least one fluid distribution channel and at least one fluid distribution port for each clipper, and means for connecting each fluid distribution port to a clipper for transmitting pressurized fluid to the clipper.

7. A device as in claim 6, the rotary union inner member defining two independent receiving ports and networks, the rotary union outer member defining two independent fluid distribution channels and two ports for each clipper.

8. A device as in claim 7, each fluid distribution channel constituting a continuous annular groove in the rotary union outer member.

9. A device as in claim 8, further comprising valves mounted for rotation with the clippers and static actuators, the valves sweeping past the actuators to cause the valves to trigger at rotational locations as desired.

10. The device of claim 1 in which the wedge members each include a horizontally planar wedge plate having radially extending sides, a pair of vertically spaced, radially extending rails on each side defining a radially extending slide channel, the wedge plates extending arcuately, circumferentially, to define uniformly narrow, radially extending clipper passages, each clipper including flange plates riding in slide channels, and each clipper slidable in a clipper passage.

11. A device as in claim 10 in which each rail and clipper flange defines spaced pin openings, each clipper being pinned in a clipper passage when in use.

12. A device as in claim 11 in which the spaced pin openings defined in the clipper flanges are substantially more closely spaced than the spaced pin openings in the rails.

13. A device as in claim 10 in which the wedge members are joined by tie straps.

* * * * *